(12) United States Patent
Im et al.

(10) Patent No.: US 10,564,070 B1
(45) Date of Patent: Feb. 18, 2020

(54) METHOD FOR DETECTING DAMAGED-BEARING IN ENGINE USING VIBRATION SIGNAL

(71) Applicants: HYUNDAI MOTOR COMPANY, Seoul (KR); KIA MOTORS CORPORATION, Seoul (KR)

(72) Inventors: Hyuk Im, Suwon-si (KR); Dong-Chune Hong, Seongnam-si (KR); Jin-Kwon Kim, Seoul (KR); Dae-Woon Kim, Anyang-si (KR); Jun-Ho Park, Seoul (KR); Il-Joong Hwang, Hwaseong-si (KR); Hong-Wook Lee, Seongnam-si (KR); Hyun-Jun Lim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/144,424

(22) Filed: Sep. 27, 2018

(30) Foreign Application Priority Data

Aug. 27, 2018 (KR) .......... 10-2018-0100514

(51) Int. Cl.
| | |
|---|---|
| *G01M 13/045* | (2019.01) |
| *F02D 35/02* | (2006.01) |
| *F02B 77/08* | (2006.01) |
| *G01L 23/22* | (2006.01) |
| *F01M 11/12* | (2006.01) |

(52) U.S. Cl.
CPC ......... *G01M 13/045* (2013.01); *F02B 77/085* (2013.01); *F02D 35/027* (2013.01); *F01M 11/12* (2013.01); *G01L 23/221* (2013.01)

(58) Field of Classification Search
CPC .. G01M 13/045; F02B 77/085; F02D 35/027; F01M 11/12; G01L 23/221
USPC .......................................................... 73/593
See application file for complete search history.

(56) References Cited

FOREIGN PATENT DOCUMENTS

| JP | 4117500 B2 | 7/2008 |
|---|---|---|
| JP | 2009-030470 A | 2/2009 |
| KR | 10-2010-0062421 A | 6/2010 |
| KR | 10-1482509 B1 | 1/2015 |
| KR | 101482509 B1 * | 1/2015 |

* cited by examiner

*Primary Examiner* — Tarun Sinha
(74) *Attorney, Agent, or Firm* — Brinks Gilson & Lione

(57) ABSTRACT

A method for detecting a damaged-bearing in an engine using a vibration signal may include: separating, by a controller, a vibration signal of the engine detected by a vibration detecting device installed on one side of the engine of a vehicle into a vibration signal caused by combustion knocking and a vibration signal generated in a bearing, extracting a signal in a predetermined natural frequency band from the vibration signal generated in the bearing using a band-pass filter, and processing the extracted signal to a quantified bearing signal using the controller, and comparing the quantified bearing signal with a preset damaged-bearing criterion using the controller to determine whether the quantified bearing signal is equal to or higher than the preset damaged-bearing criterion to determine a damage to the bearing.

13 Claims, 21 Drawing Sheets

<NORMAL ENGINE>

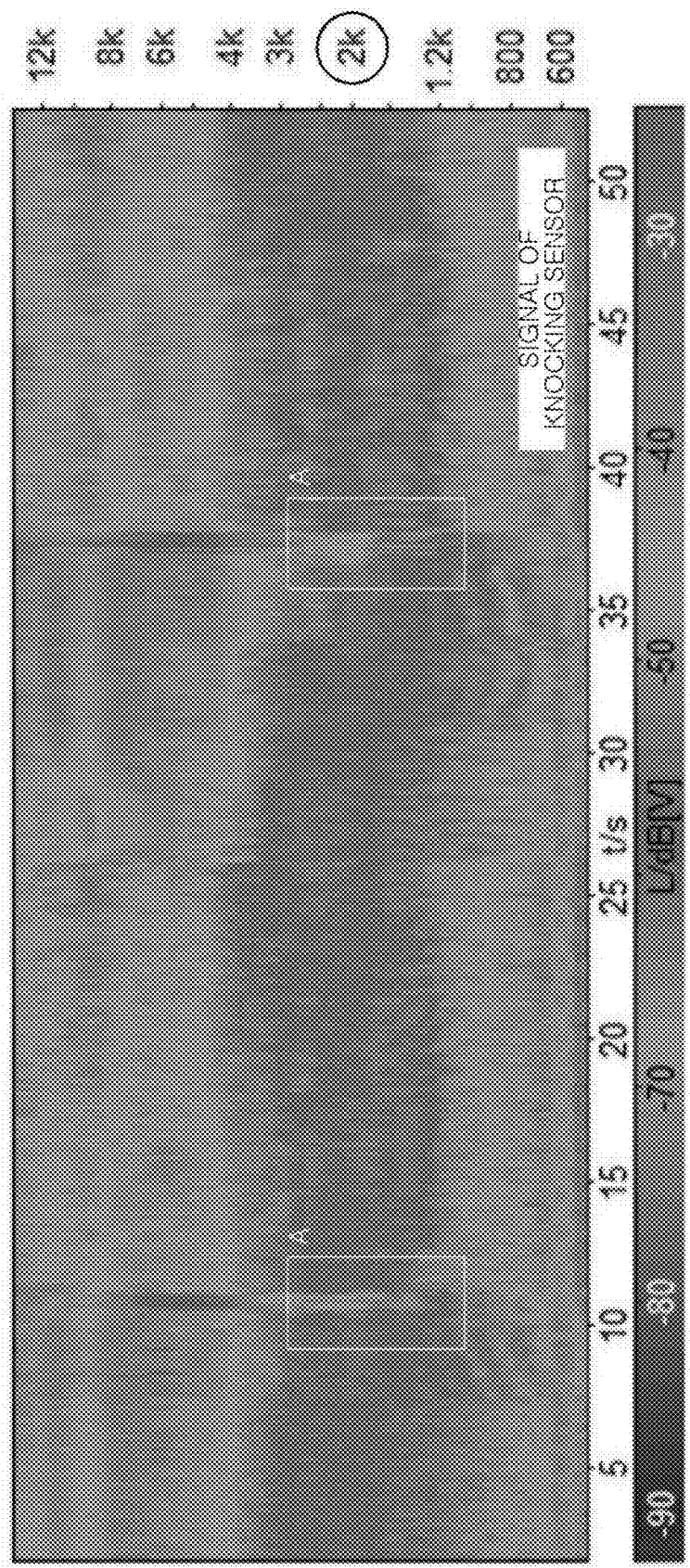

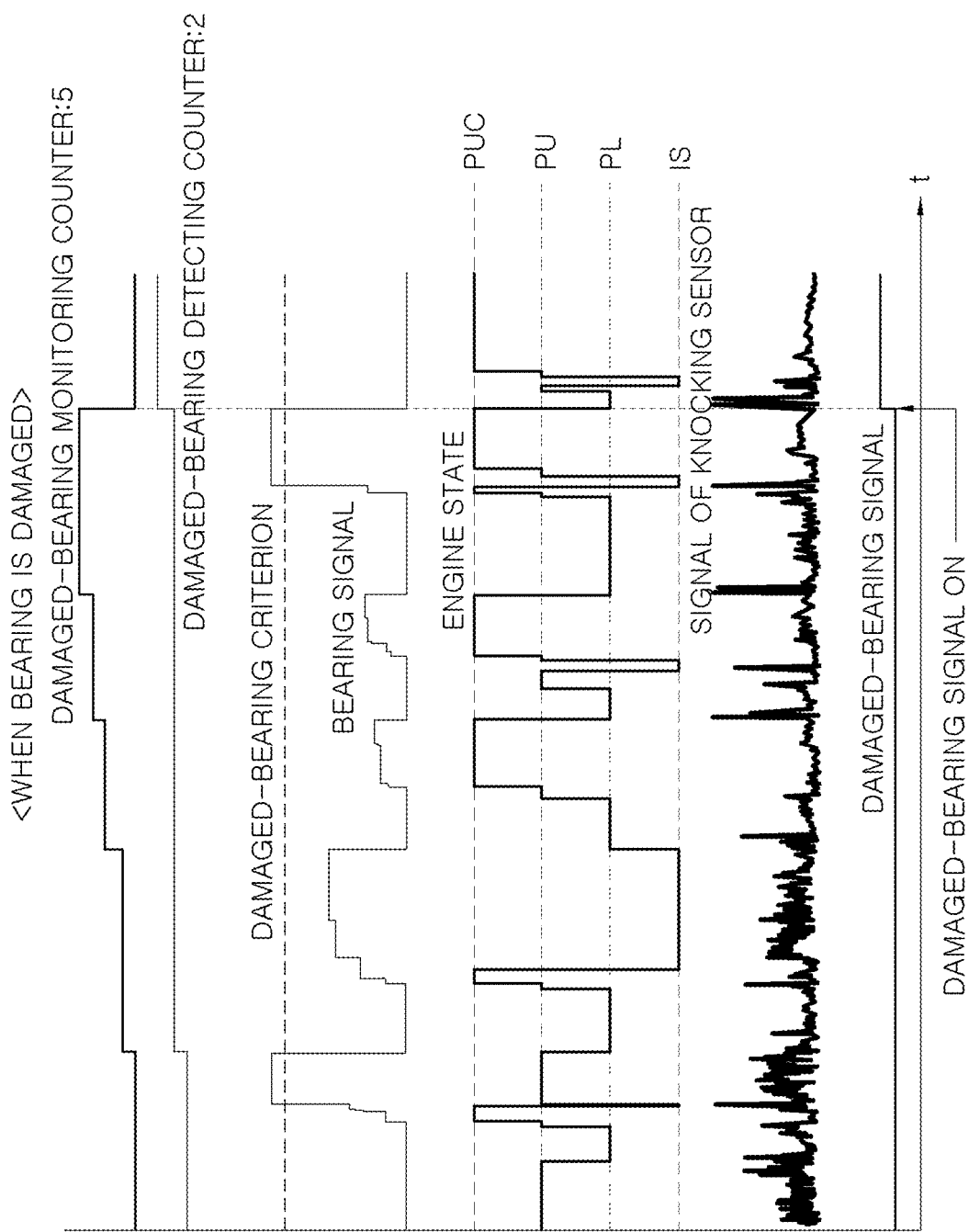

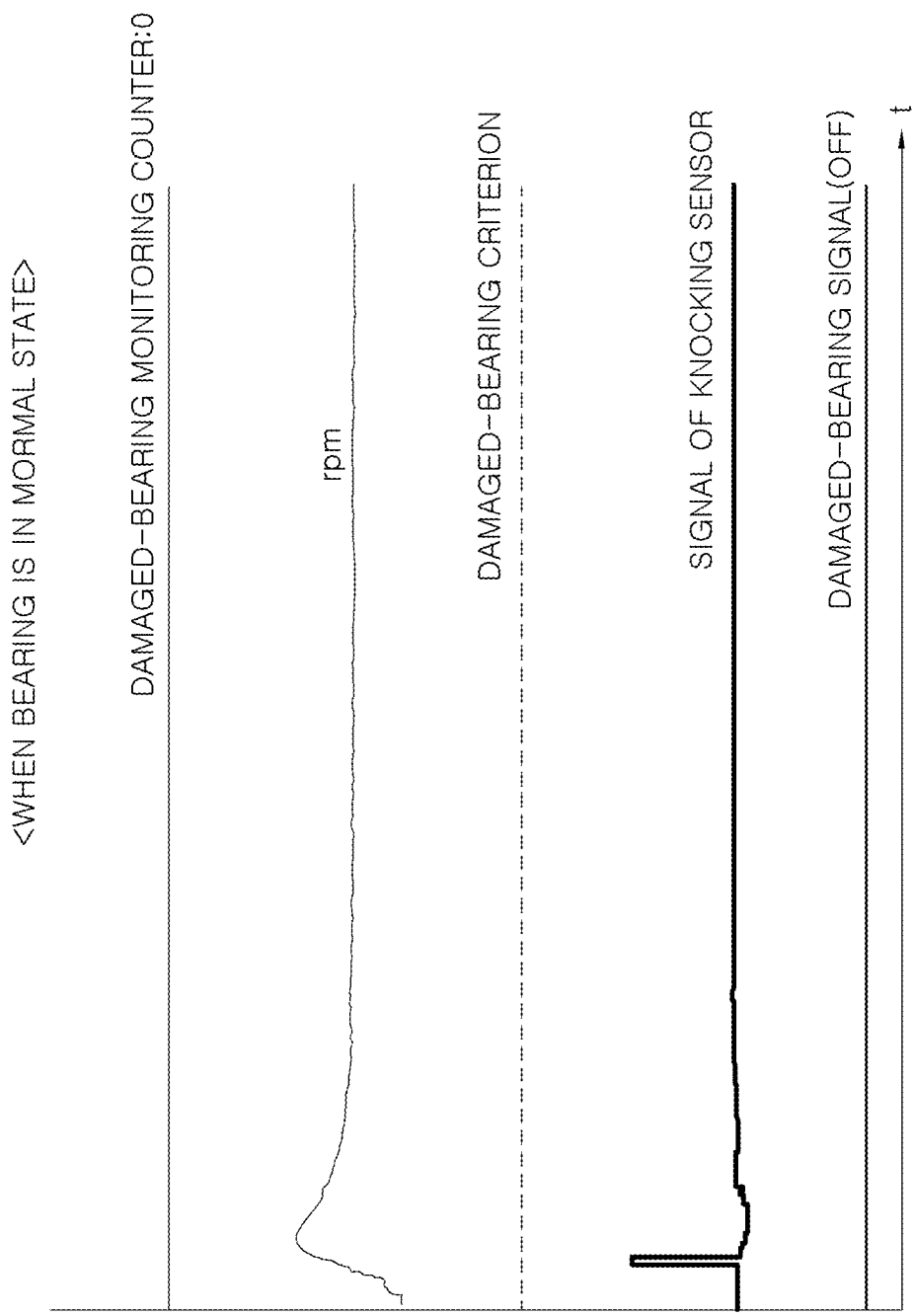

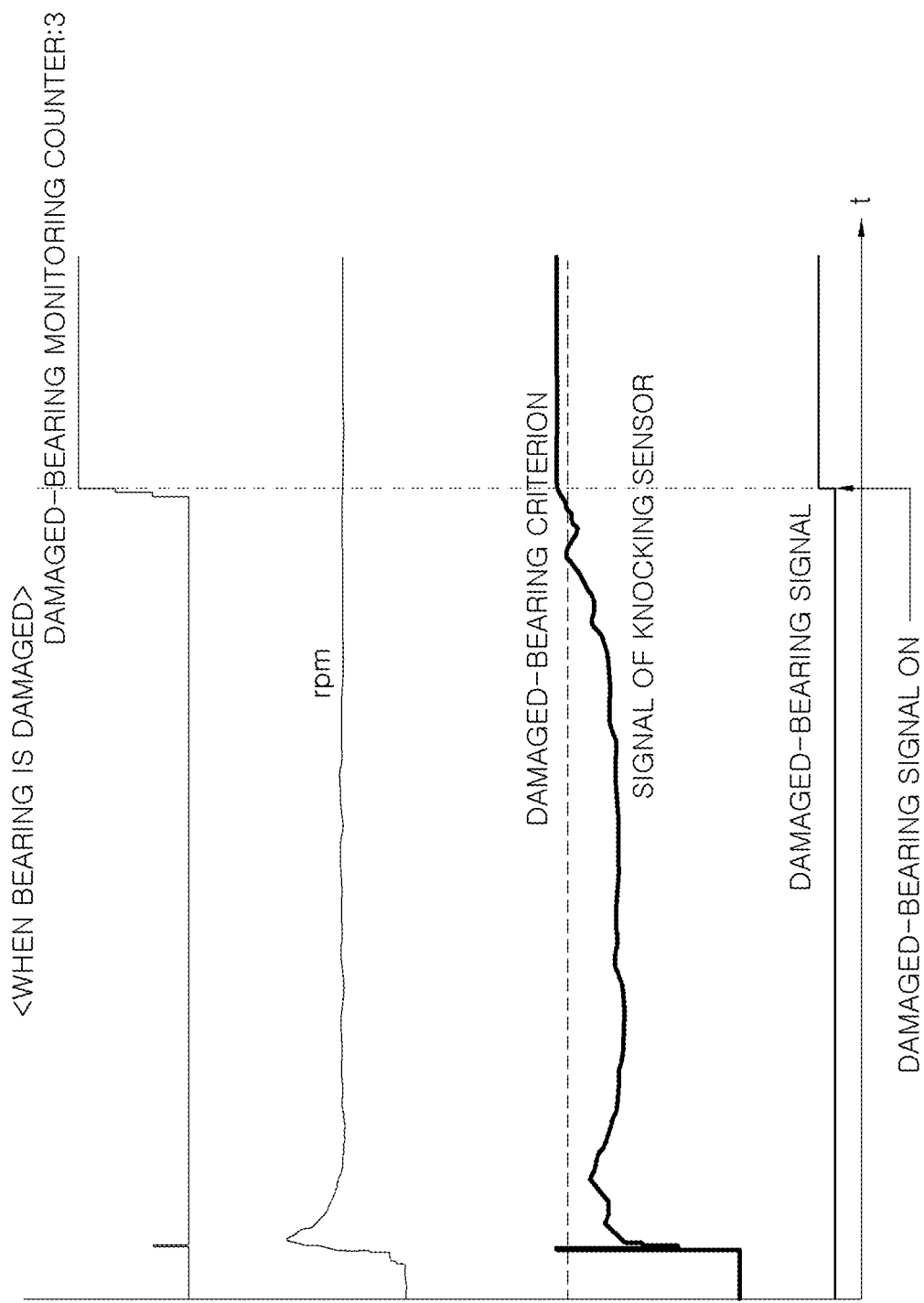

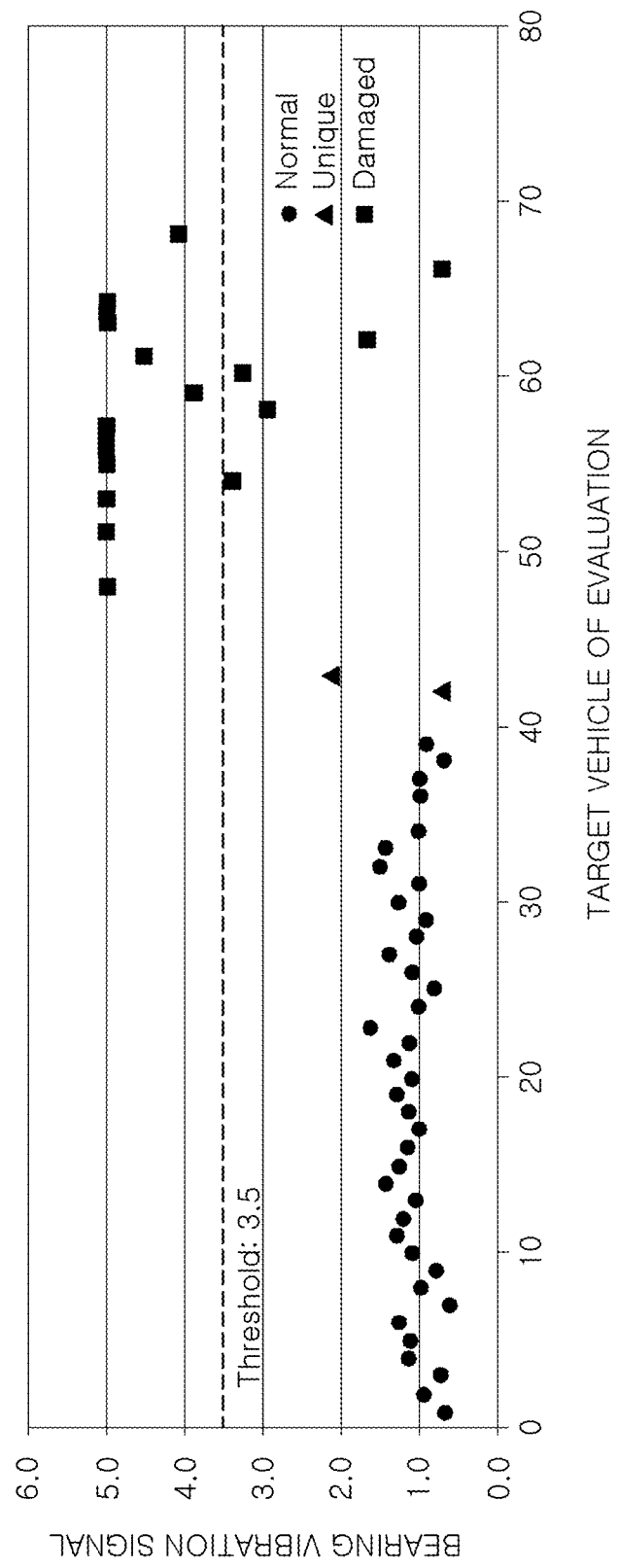

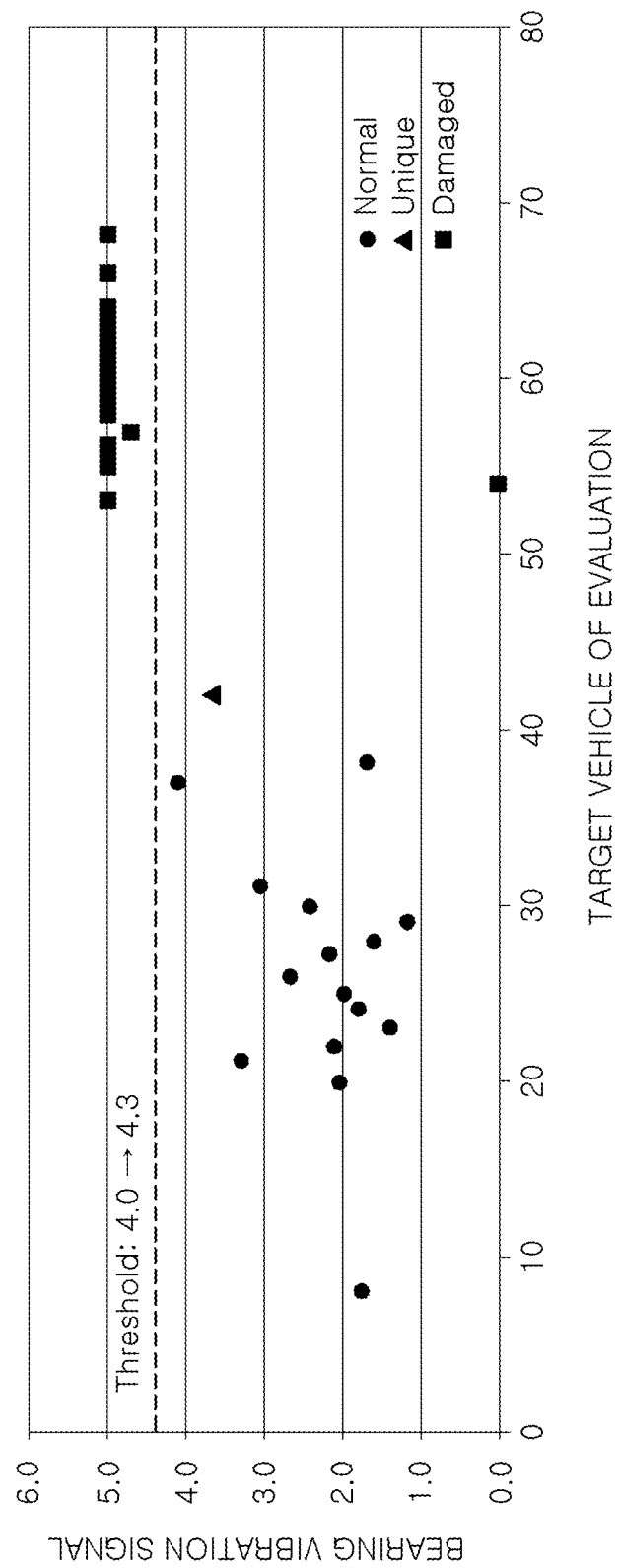

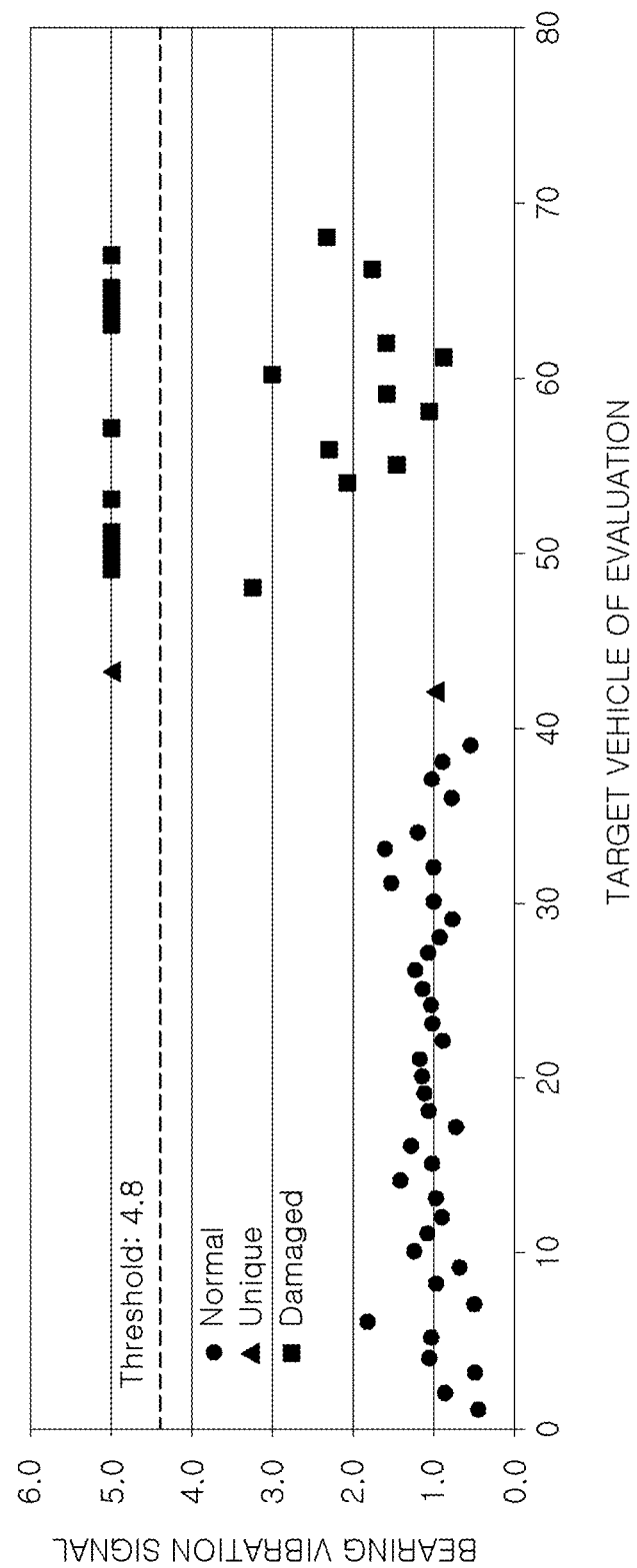

METHOD FOR DETECTING DAMAGED-BEARING IN ENGINE USING VIBRATION SIGNAL

CROSS-REFERENCE TO RELATED APPLICATION

This application claims priority to and the benefit of Korean Patent Application No. 10-2018-0100514, filed on Aug. 27, 2018, the entire contents of which are incorporated herein by reference.

FIELD

The present disclosure relates to a method of detecting a damaged-bearing in an engine using a vibration sensor.

BACKGROUND

The statements in this section merely provide background information related to the present disclosure and may not constitute prior art.

An engine of a vehicle is operated in a state where various components are coupled to each other, and a bearing is mounted on a portion at which components are coupled and operated, to reduce friction.

In FIG. 1, a portion at which a connecting rod 11 and a crankshaft are coupled to each other is illustrated. A big end of the connecting rod 11 is coupled to the crankshaft to surround a crank pin 12, and a bearing 13 is provided between the big end of the connecting rod 11 and the crank pin 12. In addition, a gap between the big end of the connecting rod 11 and the crank pin 12 is filled with motor oil to reduce friction between the big end of the connecting rod 11 and the crank pin 12 when the engine is operated. In a normal state (see FIG. 1), a gap between the bearing 13 and the crank pin 12 is small, and an oil film is formed between the bearing 13 and the crank pin 12 by the motor oil, so that noise and vibration are small.

However, we have discovered that when the engine is operated for a long period of time under abnormal conditions (e.g., foreign substance inflow, oil shortage, poor connecting rod journal machining state, etc.) (see FIG. 2) and in a state where the bearing 13 is abraded and damaged, a gap G between the bearing 13 and the crank pin 12 is increased and noise and vibration are generated by a knock of the connecting rod 11 and the crank pin 12 during operation of the engine.

When the above state is continued, as illustrated in FIG. 3, the bearing 13 has a seizure on the crank pin 12, and thus oil supply between the big end of the connecting rod 11 and the crank pin 12 is interrupted. When the engine is operated in a state where the bearing 13 is damaged on the connecting rod 11 as described above, damage to the bearing is progressed to seizure of the bearing and metal contact occurs on the bearing 13, the big end of the connecting rod 11 and the like, thereby generating noise and vibration beyond normal range. Also, the bearing 13 or the like is damaged.

When the bearing 13 is damaged, due to an increase in frictional resistance, a phenomenon of an engine stall a vehicle is generated. That is, when the bearing 13 is damaged, an output of the engine is reduced due to an increase in frictional resistance, and revolutions per minute (RPM) of the engine is increased when an accelerator pedal is operated to recover reduction of the output. We have also discovered that an increase in the RPM of the engine repeats a vicious cycle in which the frictional resistance of the portion on which the bearing 13 is installed is increased again. At this time, the temperature of the friction portion is increased due to an increase of the frictional resistance, seizure is accelerated as the temperature of the bearing 13 is increased, and the components adjacent to the bearing 13, i.e., the connecting rod 11 and the crank pin 12, are also damaged, which causes damage to the engine.

When seizure of the bearing 13 occurs as described above, this leads to an overall problem of the engine and causes a problem such as engine stall. This cannot be solved only by repairing or replacing any one of the components, and the entire engine had to repaired or replaced.

The contents described in Description of Related Art are to help the understanding of the background of the present disclosure, and may include what is not previously known to those skilled in the art to which the present disclosure pertains.

SUMMARY

The present disclosure provides a method for detecting a damaged-bearing in an engine using a vibration signal, which separates, processes and monitors the vibration signal transmitted from the engine, and determines damage to the bearing when a vibration is inputted more than the predetermined number of times, without adding any additional hardware.

In one form of the present disclosure, a method for detecting a damaged-bearing in an engine may include: separating, by a controller, a vibration signal of the engine detected by a vibration detecting device installed on one side of the engine of a vehicle into a vibration signal generated by combustion knocking and a vibration signal generated by a bearing; extracting a signal in a predetermined natural frequency band from the vibration signal generated by the bearing using a band-pass filter; processing, by the controller, the extracted signal to a quantified bearing signal; comparing, by the controller, the quantified bearing signal with a preset damaged-bearing criterion; and determining, by the controller, whether the quantified bearing signal is equal to or greater than the preset damaged-bearing criterion to determine a damage to the bearing.

In processing the extracted signal, a frequency in the range of approximately 1.5 kHz to 2.5 kHz in the vibration signal generated by the bearing may be set as a center frequency, a frequency band within a preset frequency band in the center frequency may be set as a natural frequency band, and signals other than the natural frequency band may be removed.

The method for detecting the damaged-bearing may further includes, increasing a damaged-bearing counter when the quantified bearing signal is equal to or greater than the preset damaged-bearing criterion; and determining that the bearing is damaged when an accumulated damaged-bearing counter is greater than a preset damage determining cumulative damaged-bearing counter.

The method for detecting the damaged-bearing may further include detecting an operating state of the engine by the controller, and the preset damaged-bearing criterion may be differently set based on the detected operating state of the engine.

In detecting the operating state of the engine, it may be determine whether the engine is being decelerated and in a preset condition.

In detecting the operating state of the engine, the operating state of the engine is determined as an initial deceleration state when a decrement of the RPM of the engine is initiated, a first operating state when the engine enters an idle state during deceleration while the RPM of the engine is decreased and is changed into the RPM of the idle state, or a second operating state when the engine enters the idle state from a fuel cut state during deceleration.

The method for detecting the damaged-bearing may further include: increasing a monitoring counter when the operating state of the engine is the initial deceleration state, the first operating state or the second operating state, and wherein, in determining that the bearing is damaged, and when the accumulated monitoring counter is equal to or greater than the preset damage determining cumulative damaged-bearing counter within a damaged-bearing judging cumulative monitoring counter, it may be determined that the bearing is damaged.

In increasing the monitoring counter, the monitoring counter may be set for each of the states of the engine (i.e., the initial deceleration state, the first operating state and the second operating state), and when the engine enters any state (i.e., the initial deceleration state, the first operating state and the second operating state), the monitor counter is increased based on the entered operating state of the engine.

In determining whether the bearing is damaged, it may be detected whether the engine is in the idle operating state or in a partial load operating state.

When the operating state of the engine is the idle operating state or in the partial load operating state, only the damaged-bearing counter may be accumulated, and when the accumulated damaged-bearing counter is greater than the damage determining cumulative damaged-bearing counter, it may be determined that the bearing is damaged.

The method for detecting the damaged-bearing may further include performing a limp home mode for limiting the RPM of the engine to the preset safe maximum RPM or less after determining that the bearing is damaged.

In performing the limp home mode, an acceleration pedal value of the vehicle may be limited to a preset upper limit value.

The method for detecting the damaged-bearing in the engine may include operating a warning device after determining that the bearing is damaged, the warning device may be provided in an interior of the vehicle and configured to alert an occupant that the bearing is damaged.

The method for detecting the damaged-bearing in the engine may further include determining whether a diagnosis initiation condition is satisfied to determine whether the vibration signal of the engine sensed by the vibration detecting device is stabilized, before performing separating the signal.

The method further may further include determining whether a diagnosis initiation condition is satisfied to determine whether the engine is warmed-up, and separating the signal may be performed when it is determined that the engine is warmed up.

When a temperature of the engine oil is equal to or higher than a preset temperature, a warming up of the engine is completed to perform separating the signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6B is a graph illustrating a state in which the signal measured by the vibration sensor at deceleration in the engine in which the bearing is damaged is fast Fourier transformed (FFT);

FIG. 9B is a graph illustrating a state of the engine and a state of the knocking sensor when the engine in which the bearing is damaged enters the idle state from the fuel cut state during deceleration;

FIG. 10A is a graph illustrating a state of the engine and a state of the knocking sensor when the engine in which the bearing is in a normal state is in the idle state;

FIG. 10B is a graph illustrating a state of the engine and a state of the knocking sensor when the engine in which the bearing is damaged is in the idle state;

Figure 12:
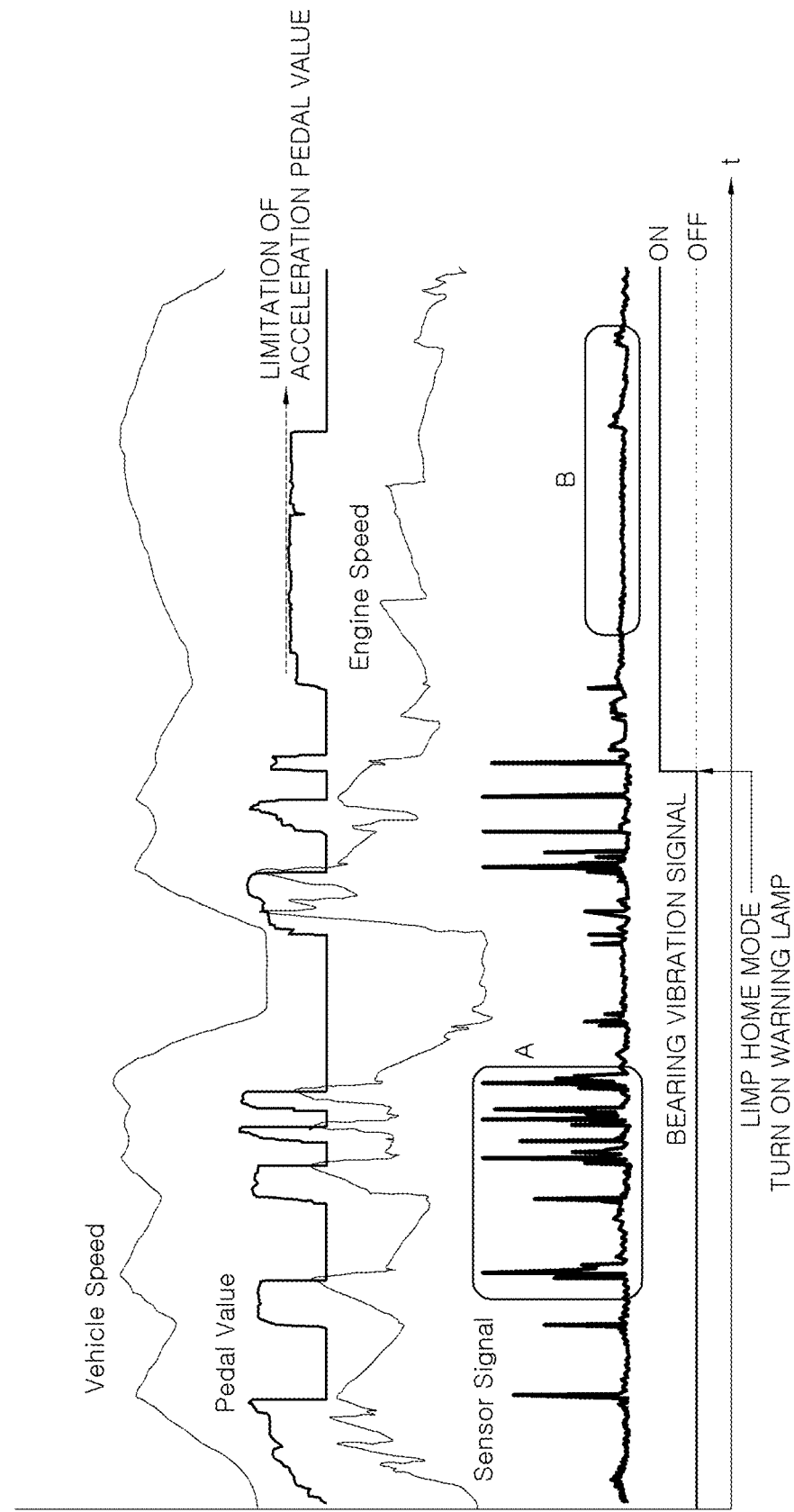

FIGS. 11A to 11E are graphs illustrating a damaged-bearing criterion according to each driving condition in the method for detecting the damaged-bearing in the engine using the vibration signal; and FIG. 12 is a graph illustrating a vehicle speed, an acceleration pedal value, the RPM of the engine and a state of the sensor signal before and after the damaged-bearing is determined in the method for detecting the damaged-bearing in the engine using the vibration signal.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for detecting a damaged-bearing in an engine using a vibration signal in an exemplary form of the present disclosure is described in detail with reference to the accompanying drawings.

First of all, a system for performing a method for detecting a damaged-bearing in an engine using a vibration signal in one form of the present disclosure is described as below.

Figure 1:
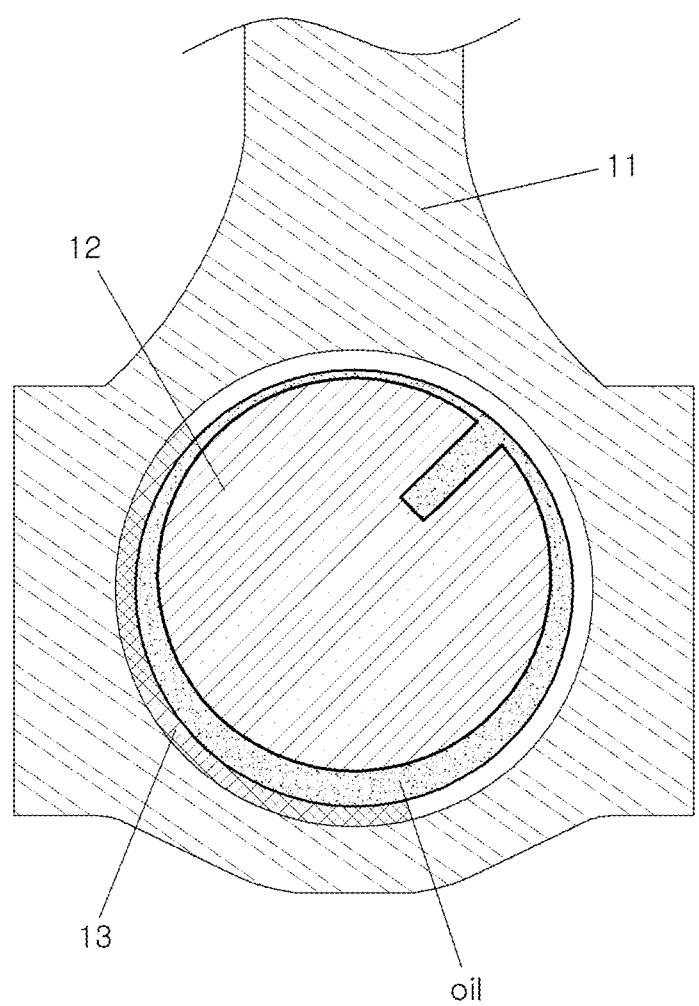
FIGS. 1 to 3 are cross-sectional views illustrating a process in which a bearing has a seizure at a region where a connecting rod and a crank pin are connected to each other in an engine.
Figure 2:
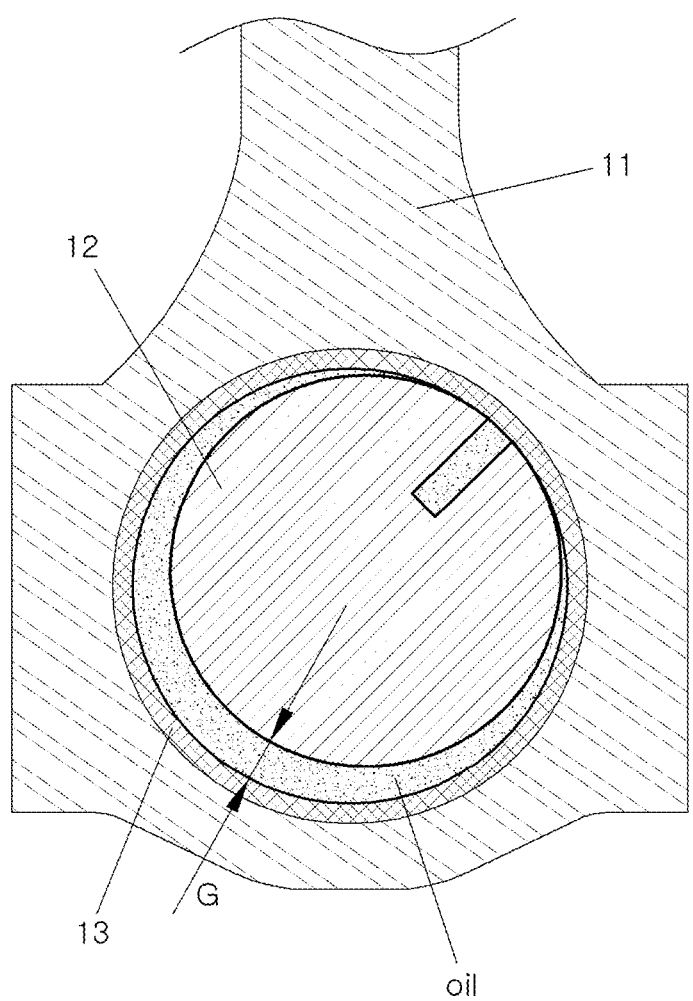
Figure 3:
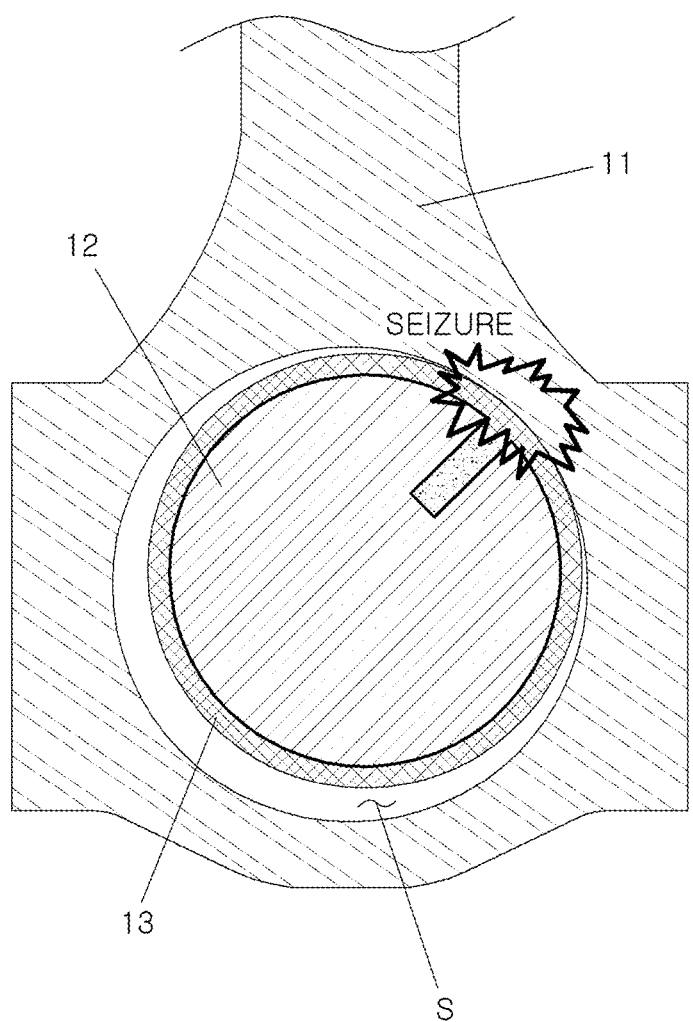
Figure 4:
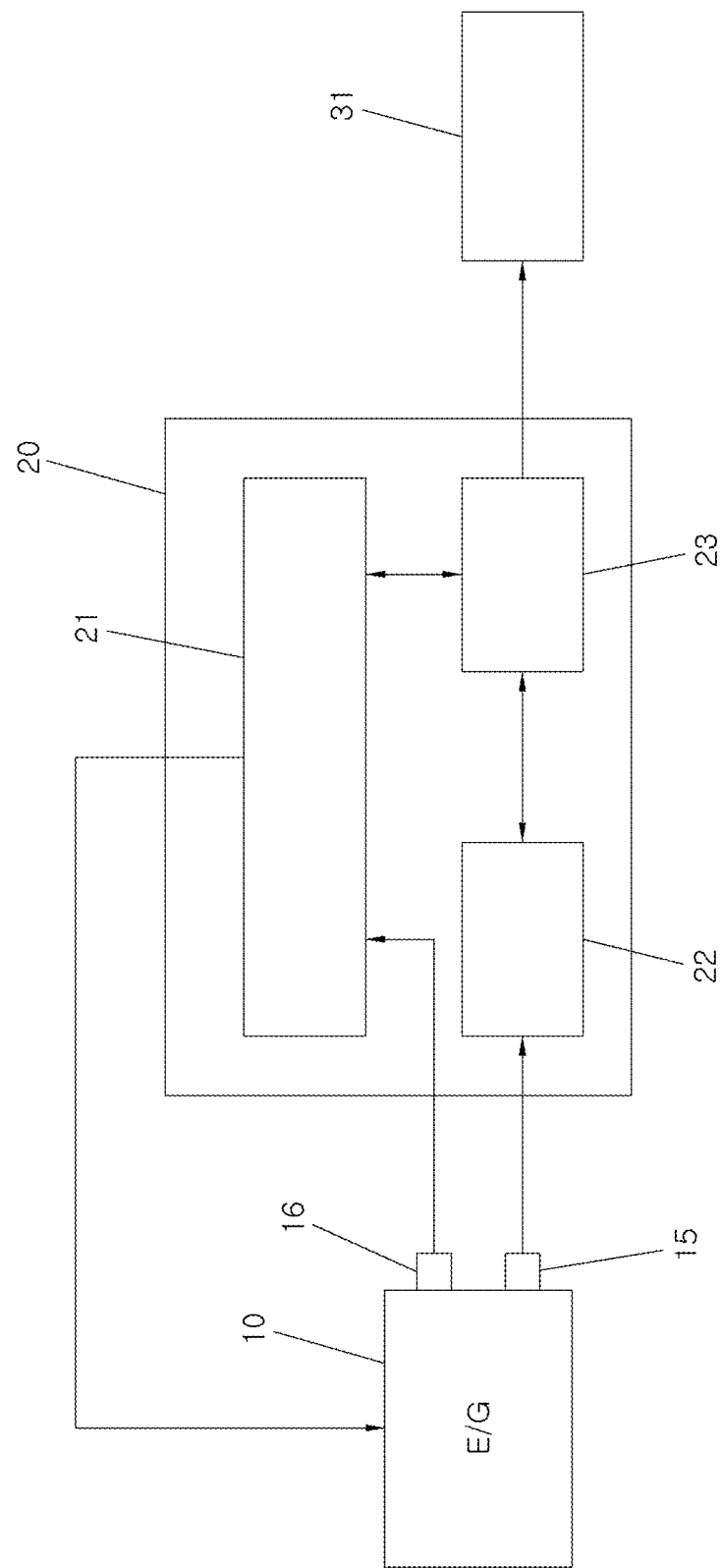
FIG. 4 is a block diagram illustrating a system for performing a method for detecting a damaged-bearing in an engine using a vibration signal.
Figure 5:
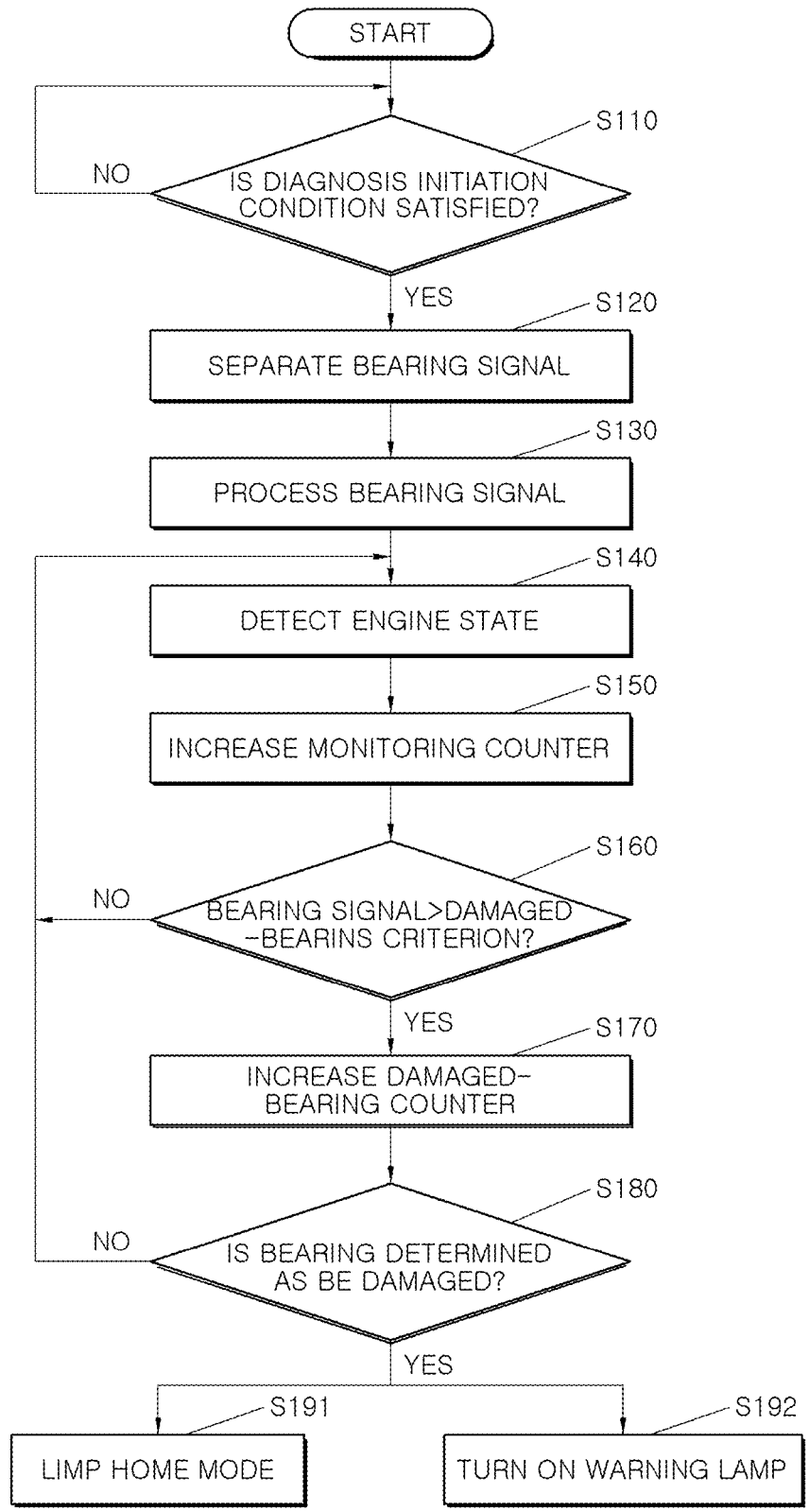
FIG. 5 is a flowchart illustrating a method for detecting a damaged-bearing in the engine using the vibration signal.

As shown in FIG. 4, the system includes a knocking sensor 15 installed at one side of an engine 10 for measuring vibration transmitted from the engine 10 to detect knocking of the engine, and a controller 20 provided for controlling operation of the engine 10 and judging that a bearing 13 of the engine 10 is damaged when a magnitude of vibration signal, which is generated by the damaged-bearing, among vibration signals generated in the engine is greater than a bearing damage criteria.

On one side of the engine 10, the knocking sensor 15, which is a detecting means for detecting the vibration generated in the engine 10 when the engine 10 is operated, is provided. The knocking sensor 15 detects the vibration signal generated by knocking when knocking is generated during combustion.

In the present disclosure, in view of the fact that the vibration is generated even when the bearing 13 provided at a portion where the crank pin 12 of the crankshaft and the connecting rod 11 are connected is damaged, the vibration generated by knocking as well as the vibration caused by damage to the bearing 13 are detected by the knocking sensor 15.

However, knocking and damage to the bearing are detected through a signal separation and a signal processing for the vibration detected by the knocking sensor 15.

The vibration signal detected by the knocking sensor 15 is processed with respect to a crank angle of a crank and a window which is a specific rotation angle range of the engine where the signal can be generated, so that it is also possible to confirm which cylinder the bearing 13 is damaged.

In addition to the knocking sensor 15, various sensors for measuring the state of the engine 10 are provided at one side of the engine 10. For example, an oil temperature sensor 16 for measuring a temperature of engine oil is provided, so that the temperature of the engine oil can be grasped.

The controller 20 controls combustion of the engine 10 according to a driver's operation and processes a signal inputted from the knocking sensor 15 to judge whether the connecting rod bearing 13 is damaged. For example, the controller 20 may include an engine controlling section 21 configured to control the combustion of the engine 10 according to the driver's operation, a signal processing section 22 configured to separate the signal from the knocking sensor 15 into the vibration signal caused by knocking and the vibration signal caused by the damaged-bearing and to quantify a bearing signal, and a damaged-bearing judging section 23 configured to judge damage to the bearing 13 using the bearing signal processed in the signal processing section 22. The method for detecting the damaged-bearing in the engine using the vibration signal, which will be described later, is stored in the controller 20 as a logic, so that the method for detecting the damaged-bearing in the engine using the vibration signal is performed by the controller 20. The controller may be implemented by at least one processor operated by a setting program, in which the setting program includes a series of commands for performing each step included in the method according to the present disclosure to be described below.

The engine controlling section 21 may control combustion in the engine 10 to allow the engine 10 to generate a desired torque according to the driver's operation, a travelling state of a vehicle, and the like. Since the control of the engine 10 performed by the engine controlling section 21 corresponds to a conventional control of the engine 10, a detailed description thereon will be omitted.

The signal processing section 22 separates the vibration signal caused by damage to the bearing 13 from the vibration signal caused by combustion knocking among the signals outputted from the knocking sensor 15. The knock signal separated by the signal processing section 22 is used to control knocking by a separate knocking control logic. In particular, a signal in a predetermined natural frequency band is extracted from the bearing signal separated by the signal processing section 22, and the extracted signal is amplified and integrated to be processed into a quantified bearing signal.

The damaged-bearing judging section 23 compares the bearing signal with a preset damaged-bearing criterion to judge whether the bearing 13 is damaged. The damaged-bearing judging section 23 judges damage to the bearing 13 through the method of detecting the damaged-bearing in the engine using the vibration signal, which is described later. When it is determined in the damaged-bearing judging section 23 that that the bearing 13 is damaged, the engine controlling section 21 controls the engine to be operated in a limp home mode.

When the controller 20 determines that the bearing 130 is damaged, a warning means alerts an occupant to recognize that the bearing 13 is damaged.

For example, a warning lamp 31 installed in an interior or on a dashboard of the vehicle may be employed as the warning means. When damage to the bearing 13 is detected, the controller 20 may turn on the warning lamp 31 to allow the occupant to recognize damage to the bearing 13.

On the other hand, a speaker installed at one side of the interior of the vehicle may be employed as another example of the warning means.

The method for detecting the damaged-bearing in the engine using the vibration signal in one form of the present disclosure includes: a signal separating step S120 of separating the vibration signal of the engine 10 detected by the vibration detecting means provided on one side of the engine 10 of the vehicle into the vibration signal caused by combustion knocking and the vibration signal generated in the bearing 13, a signal processing step S130 of extracting the signal in the predetermined natural frequency band from the vibration signal generated in the bearing 13 through a band-pass filter, amplifying and integrating the extracted signal to be processed into a quantified bearing signal, and a damaged-bearing judging step S160 of determining whether the bearing signal is higher than the preset damaged-bearing criterion.

Figure 6A:
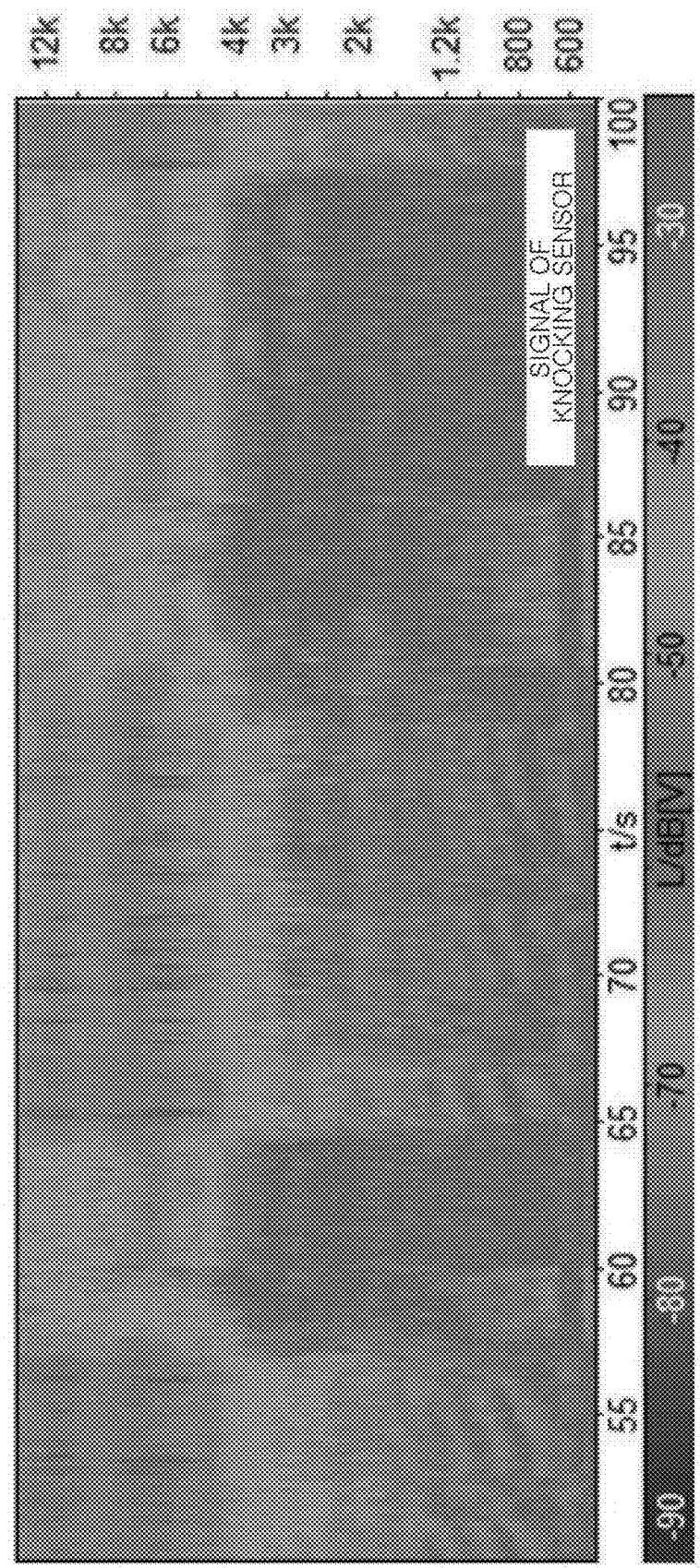
FIG. 6A is a graph illustrating a state in which a signal measured by a vibration sensor at deceleration in the normal engine is fast Fourier transformed (FFT)

FIGS. 6A and 6B illustrate the vibration signals of the normal engine (FIG. 6A) in which the bearing is not damaged and of the engine (FIG. 6B) in which the bearing is damaged, respectively.

When the signal measured by the knocking sensor under a deceleration condition during travelling is subjected to the fast Fourier transform (FFT) processing and compared, it can be seen that the engine in which the bearing 13 is damaged has the natural frequency of approximately 2 kHz as compared with the normal engine. Combustion knocking measured by the knocking sensor 15 has the natural frequency of approximately 5 to 6 kHz in a first range, approximately 11 to 12 kHz in a second range, and approximately 15 to 16 kHz in a third range, whereas when the bearing 13 is damaged, the signal has the natural frequency of approximately 2 kHz. Therefore, it is possible to detect damage to the bearing 13 using this phenomenon.

In the normal engine, furthermore, when the deceleration progresses during operation, the load applied to the bearing 13 is lowered as a speed of the engine is decreased. However, in the engine in which the bearing is damaged, a clearance is increased due to damage to the bearing. Therefore, the vibration detected in the engine 10 becomes large, which has characteristics different from vibration due to knocking. Accordingly, damage to the bearing 13 is detected using this principle.

A diagnosis initiation condition satisfaction judging step S110 judges whether the engine 10 or the vehicle is in a state suitable for detecting damage to the bearing 13. In the present disclosure, damage to the bearing 13 is detected by using the vibration generated in the engine 10 during operation of the engine 10. After it is judged whether the vibration signal of the engine 10 is stabilized by warming up sufficiently the engine 10, the diagnosis of the bearing 13 is initiated. Before the engine 10 is warmed up, noise is generated due to friction of various kinds of components, and so it is very difficult to correctly judge whether the bearing 13 is damaged. Therefore, it is judged whether the engine 10 warms up, and damage to the bearing 13 is then diagnosed in a state where the engine has been warmed up. Meanwhile, a state of the engine 10 is diagnosed using the vibration of the engine 10. By using a temperature of engine oil instead of a temperature of cooling water, in the present disclosure, it is judged whether not the engine 10 has been warmed up. When the temperature T_oil of the engine oil is higher than a preset diagnosis initiation temperature T_THD (T_oil>T_THD), the diagnosis of damage to the bearing 13 may be initiated. Here, the diagnosis initiation temperature T_THD may be set to approximately 80□.

In the signal separating step S120, the signal measured by the knocking sensor 15 provided on the engine 10 is separated. Since the signal measured by the knocking sensor 15 is in a state in which the vibration caused by knocking of the engine 10 and the vibration caused by damage to the bearing 13, and the like are overlapped, the vibration signal, that is caused by the bearing, in the vibration signal measured by the knocking sensor 15 is separated.

In the process of separating the vibration signal, that is caused by the bearing 13, in the vibration signal measured by the knocking sensor 15, the vibration signal measured by the knocking sensor is fast Fourier transformed to separate the frequency band (approximately 2 kHz) caused by the vibration signal of the bearing 13. The remaining frequency bands, that is, approximately 5 to 6 kHz in the first range, approximately 11 to 12 kHz in the second range, and approximately 15 to 16 kHz in the third range, are used for detecting knocking, and the frequency band (approximately 2 kHz) in which when the bearing is damaged, the signal that differs from that of the normal engine 10 is outputted is separated to be used for detecting damage to the bearing 13.

The signal processing step S130 removes noise from the bearing signal separated in the signal separating step S120 and quantifies this bearing signal.

In the signal processing step S130, the separated vibration signal of the bearing is extracted into a preset natural frequency through the band-pass filter, is amplified and integrated to be processed into the quantified bearing signal. The vibration signal of the bearing 13 passes through the band-pass filter to leave only the signal in the band adjacent to the natural frequency, and the signal in the remaining band is removed. When the vibration occurs in the engine 10 due to damage to the bearing 13, an abnormal signal of a frequency of approximately 2 kHz is generated (see FIG. 6A) unlike knocking. In the signal processing step S130, a frequency selected in the range of about 2 kHz, for example, the range of approximately 1.5 kHz to 2.5 kHz is set as a center frequency, and only signal in the adjacent band within the range determined from the center frequency are left. For example, when 2 kHz is set as the center frequency, the signal of 1.565 kHz to 2.435 kHz (2 kHz±0.435 kHz) is left, and the signals (of the frequency less than 1.565 kHz and higher than 2.435 kHz) other than the above signal are removed. The above-mentioned center frequency and a dimension of the band adjacent to the center frequency may be selected according to a state.

Then, the signal is quantified through amplification and integration to be processed into the bearing signal for detecting damage to the bearing 13.

In this way, the signal of the bearing is processed into a quantification state in which noise is removed, and is then compared with the damaged-bearing criterion.

Of course, a process of detecting knocking using approximately 5 to 6 kHz in the first range, approximately 11 to 12 kHz in the second range, and approximately 15 to 16 kHz in the third range, which are the frequency bands that is not used in the signal separating step S120, proceeds separately.

The signal separating step S120 and the signal processing step S130 continue after the diagnosis initiation condition satisfaction judging step S110 when the engine 10 is being operated.

An engine state detecting step S140 detects whether the engine 10 is in a state for detecting damage to the bearing 13. Since it is possible to monitor a state of the engine mainly in deceleration of the engine 10 when the bearing 13 is damaged, it is detected whether the engine 10 is in deceleration state.

When the engine 10 is being decelerated, the load applied to the bearing is rapidly changed. When the bearing 13 is damaged, the distinguishable vibration signal is generated in the bearing 13, and damage to the bearing 13 is detected using this vibration signal.

In one form, in the engine state detecting step 140, it is determined whether the engine 10 is under a preset condition while being decelerated. It is detected whether a state of the engine 10 is any one of an initial deceleration state in which a decrement of the RPM of the engine is initiated, a state in which the engine enters an idle state during deceleration while the RPM of the engine is decreased and is changed into the RPM of the idle state, and a state in which the engine enters the idle state from the fuel cut state during deceleration. As described above, since the load acting on the bearing 13 is small in a state in which the engine 10 is being decelerated or a state in which the engine 10 is being decelerated and in a preset state, the signal generated in the bearing 13 is not large. However, if the bearing 13 is in damaged state, the vibration signal generated in the bearing 13 has power of discrimination exceeding a preset value. In the present disclosure, accordingly, damage to the bearing 13 is judged by using this vibration signal.

In addition, in the engine state detecting step S140, it is possible to detect whether a state of the engine 10 is any one of an idling operating state or a partial load operating state. In a state in which the bearing 13 is seriously damaged, as compared with the normal engine 10, the bearing signal exhibits a distinguishable signal even when the state of the engine 10 is the idling operating state or the partial load operating state. Accordingly, it is detected in the engine state detecting step S140 whether the state of the engine 10 is the idling operating state or the partial load operating state.

The engine state sensing step S140 may detect the state of the engine 10 using the signal of the RPM, which is inputted from the engine 10 to the controller 20.

When the state of the engine 10 is any one of the initial state of deceleration, the state in which the engine enters the idle state while the engine is deceleration, the state in which the engine enters the idle state from the fuel cut state during deceleration, a monitoring counter increasing step S150 is performed.

When the engine 10 is in the initial state of deceleration, enters the idle state during deceleration or enters the idle state from the fuel cut state during deceleration, a monitoring counter is increased from a current monitoring counter (current monitoring counter→current monitoring counter+ 1).

Meanwhile, in the monitoring counter increasing step S150, the monitoring counter is increased only in the same engine state. For example, when the state of the engine is detected as entering the idle state again during deceleration in a state in which the current monitoring counter for the state of entering the idle state during deceleration is "1", the monitoring counter for the state in which the engine enters the idle state during deceleration is increased to "2". When a state in which the engine enters the idle state from the fuel cut state during deceleration is newly detected, the monitoring counter for the state in which the engine enters the idle state during deceleration is maintained, and the monitoring counter for the state in which the engine enters the idle state from the fuel cut state during deceleration is increased (+1).

The above process is equally applied to the remaining state, that is, the initial state of deceleration, the state in which the engine enters the idle state during deceleration, or the state in which the engine enters the idle state from the fuel cut state during deceleration, and the monitoring counter is increased only for the same state of the engine 10 and the monitoring counter is independently managed for the different states of the engine.

The damaged-bearing judging step S160 compares the bearing signal with the preset damaged-bearing criterion.

By comparing the signal of the bearing 13 which is converted in the signal processing step 130 with the damaged-bearing criterion judging that the bearing 13 is damaged, it is judged whether the signal of the bearing is equal to or greater than the damaged-bearing criterion.

In one form, the damaged-bearing criterions are set differently according to an operating state of the engine 10. For example, the damaged-bearing criterion may be set high when the engine is in the idle state or a partial load, as compared with the damaged-bearing criterion at the initial stage of deceleration. In addition, the damaged-bearing criterion may be set low when the engine enters the idle state during deceleration, as compared with the damaged-bearing criterion at the initial stage of deceleration.

When the signal of the bearing is equal to or greater than the damaged-bearing criterion in the damaged-bearing judging step S160, a damaged-bearing counter increment step S170 increases a damaged-bearing counter from a current damaged-bearing counter (the current damaged-bearing counter→the current damaged-bearing counter+1).

If the signal of the bearing is equal to or greater than the damaged-bearing criterion in a state in which the current damaged-bearing counter is "0", the damaged-bearing counter is increased to "1".

A damaged-bearing determining step S180 determines damage to the bearing 13 using the damaged-bearing counter.

When the damaged-bearing counter is equal to or greater than a damage determining cumulative damaged-bearing counter, which is preset for determining damage to the bearing, within a damaged-bearing judging cumulative monitoring counter which is preset for determining damage to the bearing, it may be determined in the damaged-bearing determining step S180 that the bearing 13 is damaged.

Detecting that the bearing is damaged beyond the damage determining cumulative damaged-bearing counter within the damaged-bearing determining cumulative monitoring counter means that the bearing 13 is damaged and a signal related to damage to the bearing is frequently outputted.

As an example of the damaged-bearing determining S180, when the damaged-bearing judging cumulative monitoring counter is set to "5" and the damage determining cumulative damaged-bearing counter is set to "2", if the damage determining cumulative damaged-bearing counter is "2" or more in a state in which the damage determining cumulative damaged-bearing counter is within "5", it may be determined that the bearing 13 is damaged.

Herein, the damaged-bearing judging cumulative monitoring counter and the damage determining cumulative damaged-bearing counter which are set for determining damage to the bearing, respectively, may be set differently as desired.

In the damaged-bearing determining step S180, however, damage to the bearing may be determined by focusing on the damage determining cumulative damaged-bearing counter rather than the damaged-bearing judging cumulative monitoring counter.

For example, it is possible to accumulate the bearing damage counter for the same engine condition to determine damage to the bearing. In a case where the engine is operated in the idle state, it can be determined that the bearing is damaged when the damage determining cumulative damaged-bearing counter becomes "3" or more regardless of the damaged-bearing judging cumulative monitoring counter (see FIG. 10B).

Meanwhile, when it is determined in the damaged-bearing determining step S180 that the bearing 13 is not damaged, the procedure is returned to the engine state detecting step S140 to consistently monitor damage to the bearing 13. This may correspond to the case in which the accumulated monitoring counter is less than the damaged-bearing judging cumulative monitoring counter or the accumulated monitoring counter is less than the damage determining cumulative damaged-bearing counter.

When it is determined that the bearing 13 is damaged, a limp home mode step S191 is performed.

In order to inhibit or prevent damage to the bearing 13 from being further progressed, in the limp home mode step S191, the RPM of the engine 10 is limited to the preset safe maximum RPM or less. Since the maximum RPM of the engine 10 is limited, it is possible to inhibit or prevent damage to the bearing 13 from being progressed.

Further, in the limp home mode step S191, the value of the acceleration pedal is also limited to a preset value so that appropriate shifting is possible in a state in which the RPM is limited.

In addition, the engine 10 is allowed to be operated at a preset starting maintaining minimum RPM so that an ignition of the engine 10 may be maintained.

As described above, when the bearing is damaged, the vehicle is traveled in a state in which the output is limited while an ignition is maintained through the limp home mode step S191, and so the vehicle can be moved to a site where a repair is possible.

On the other hand, a warning means operating step S192 is also performed so that the driver may recognize damage to the bearing. When it is determined in the damaged-bearing determining step S180 that the bearing 13 is damaged, the warning means installed in the vehicle is operated so that the occupant may recognize the damaged-bearing. For example, a warning lamp is installed on one side of the interior or the dashboard of vehicle, and the warning lamp 31 is turned on so that the occupant recognizes damage to the bearing 13. Meanwhile, in the warning means operating step S141, it is possible to notify the occupant of damage to the bearing by not only turning on the warning lamp 31 but also warning sound or vibration, thereby preventing damage to the bearing from proceeding to seizure of the bearing.

FIG. 12 illustrates a vehicle speed, an acceleration pedal value, the RPM of the engine and a state of the sensor signal before and after the damaged-bearing is determined. In the engine in which the bearing is damaged, the bearing signal which is measured in the knocking sensor 15 and processed was large due to damage to the bearing 13 before detecting damage to the bearing 13 (see A portion in FIG. 12). However, after damage to the bearings 13 is detected and the limp home mode step S191 and the warning means operating step S192 are performed, the RPM of the engine 10 and the acceleration pedal value are in a limited state even though the bearing 13 is damaged. Therefore, the bearing signal measured by the knocking sensor 15 is lowered to a level to which the normal bearing is applied (see the portion B in FIG. 12), so that it is possible to inhibit damage to the bearing 13 from being progressed. At this time, the driver recognizes damage to the bearing through operation of the warning means such as the warning lamp 31, so that the driver may move the vehicle to a garage to perform a repair for the damaged-bearing 13.

Meanwhile, FIGS. 7A to 10B shows graphs illustrating cases in which the connecting rod bearing 13 is in normal state and in damaged state, according to the states of the engine 10. Forms from the engine state detecting step S140 to the damaged-bearing determining step S180 according to the state of the engine 10 are described as follows.

Figure 7A:
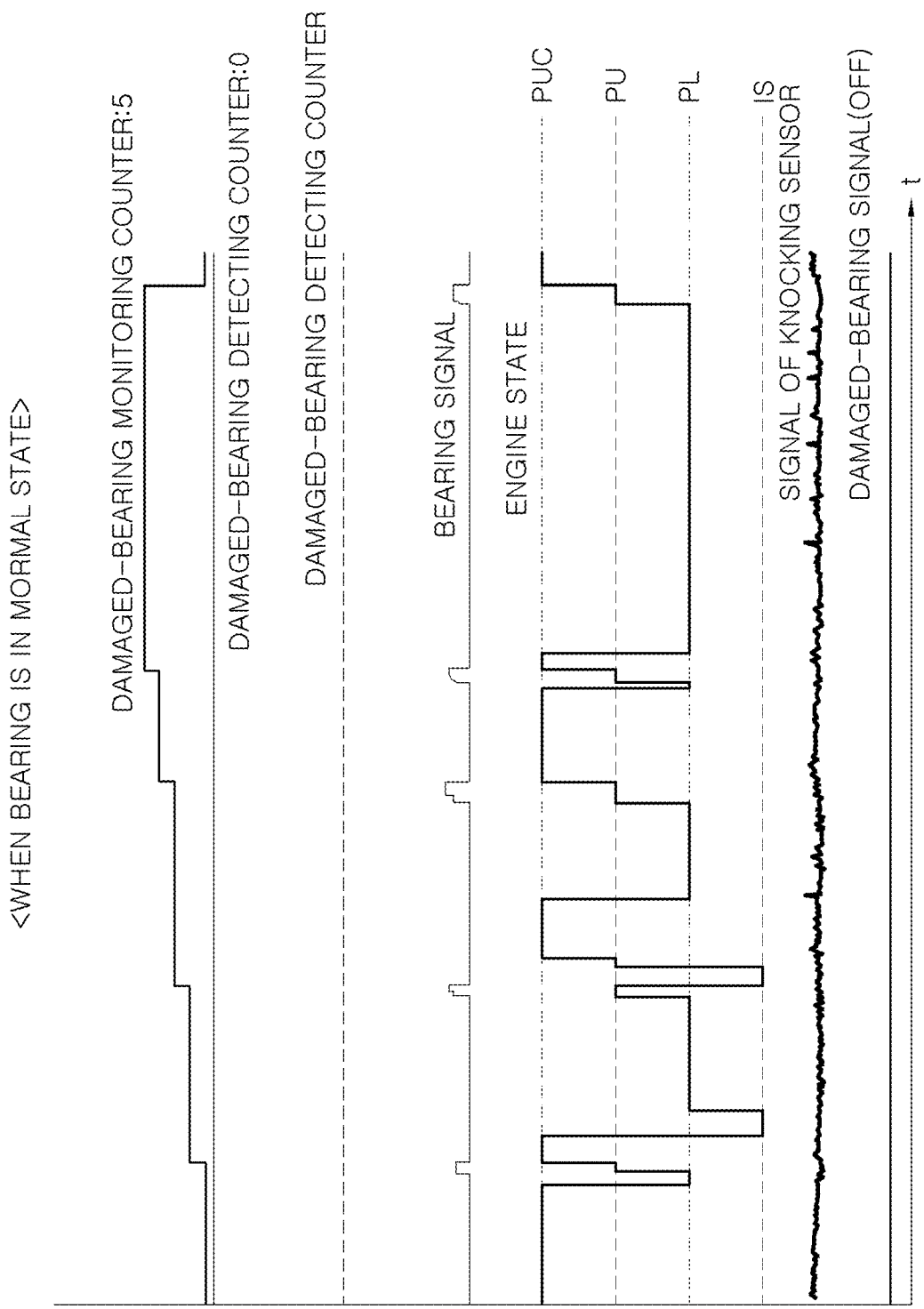
FIG. 7A is a graph illustrating a state of the engine and a state of a knocking sensor at the initial stage of deceleration in the engine in which the bearing is in a normal state.
Figure 7B:
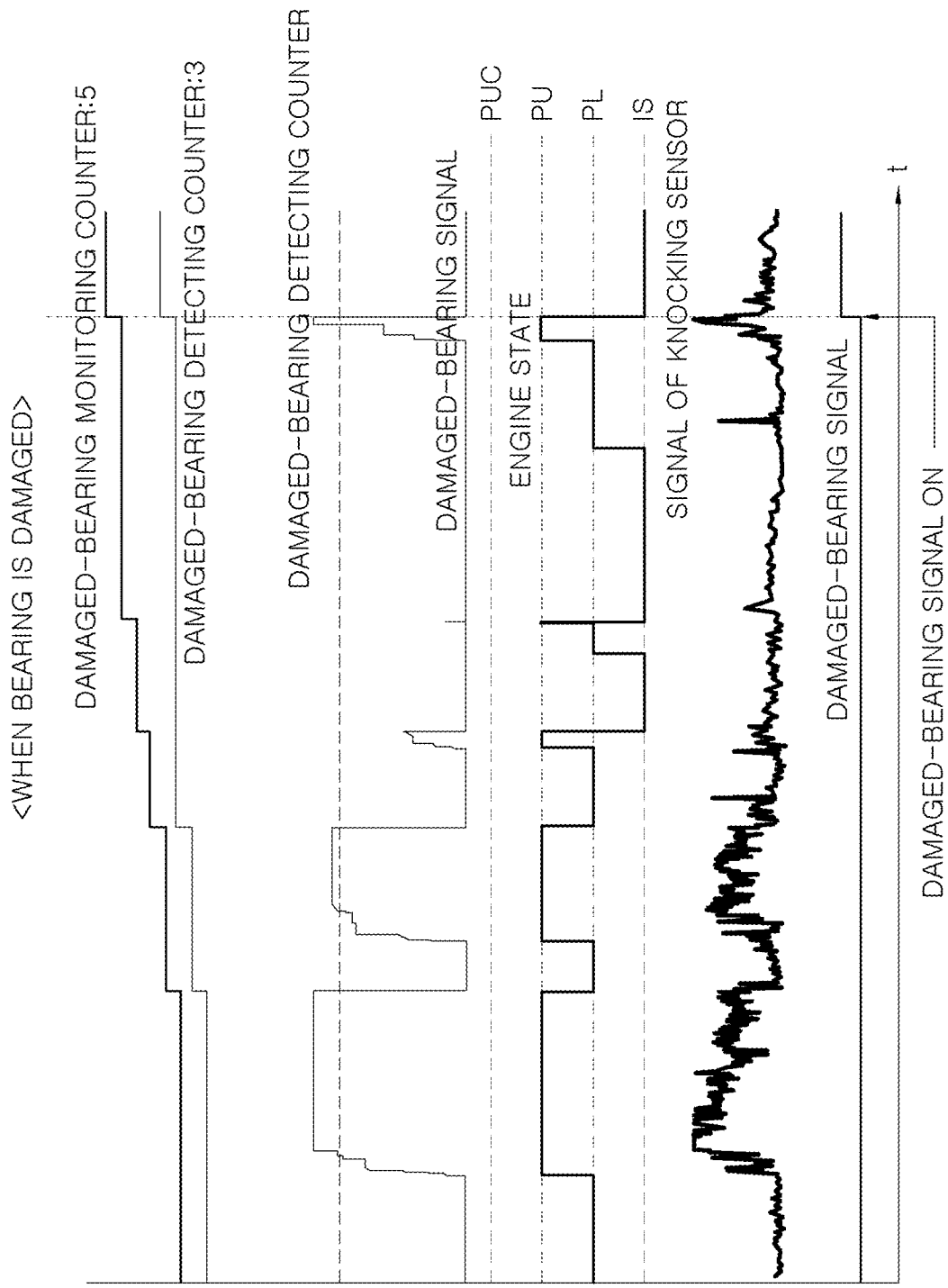
FIG. 7B is a graph illustrating a state of the engine and a state of the knocking sensor at the initial stage of deceleration in the engine in which the bearing is damaged.

First of all, FIGS. 7A and 7B illustrate cases in which the bearing 13 is in normal state and in damaged state, when the engine 10 is in the initial stage of deceleration.

In a case where the bearing 13 is normal state, when the vehicle is travelled, the engine 10 goes through a deceleration state PUC accompanying fuel cut, a deceleration state PU which does not accompany fuel cut, a partial load state PL and the idle state IS, and is then operated. In a state in which the bearing 13 is not damaged (see FIG. 7A), in the engine state detecting step S140, the monitoring counter is also increased by "1" whenever the engine 10 enters a deceleration state PU. Simultaneously, although the bearing signal is increased due to a change in bearing load at the beginning of deceleration, a magnitude of the bearing signal fails to meet the damaged-bearing criterion, and so the damaged-bearing counter is not increased.

On the other hands, in a state in which the bearing is damaged (see FIG. 7B), the monitoring counter is also increased by 1 (S150) whenever the engine 10 enters a deceleration state PU (S140). At the same time, when a magnitude of the bearing signal is compared with the damaged-bearing criterion (S160) in a state in which the bearing signal is increased due to a change of the bearing load, the bearing signal exceeds the damaged-bearing criterion. The damaged-bearing counter is increased whenever the bearing signal exceeds the damaged-bearing criterion (S170), and the damaged-bearing counter is accumulated. As compared to a state where the bearing is normal, in a state where the bearing is damaged, at the time the vehicle begins to decelerate, distinguishable noise and vibration are generated when the load of the bearing is drastically reduced, and these noise and vibration are detected and the number of detection times are accumulated.

In FIG. 7B, the monitoring counter and the damaged-bearing counter are accumulated so that the damaged-bearing counter is accumulated to "3" while the monitoring counter is accumulated to "5". Since this exceeds the preset criterion, it is determined that the bearing 13 is damaged (S180).

When it is determined at an initial stage in deceleration that the bearing is damaged (S180) as described above, any one of the limp home mode step S191 and the warning means operating step S192 is performed or both the limp home mode step S191 and the warning means operating step S192 are performed.

Figure 8A:
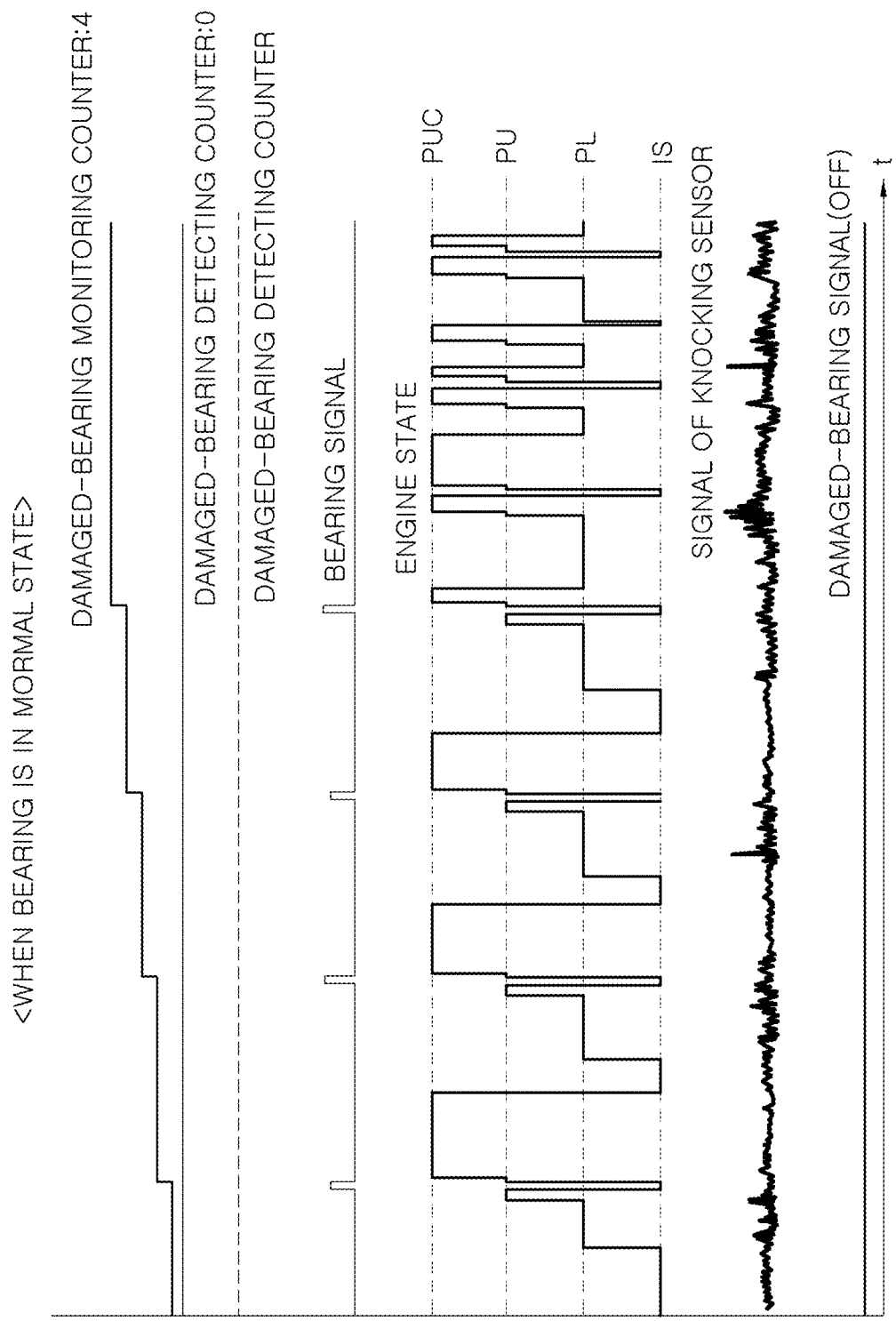
FIG. 8A is a graph illustrating a state of the engine and a state of the knocking sensor when the engine in which the bearing is in a normal state enters an idle state during deceleration.
Figure 8B:
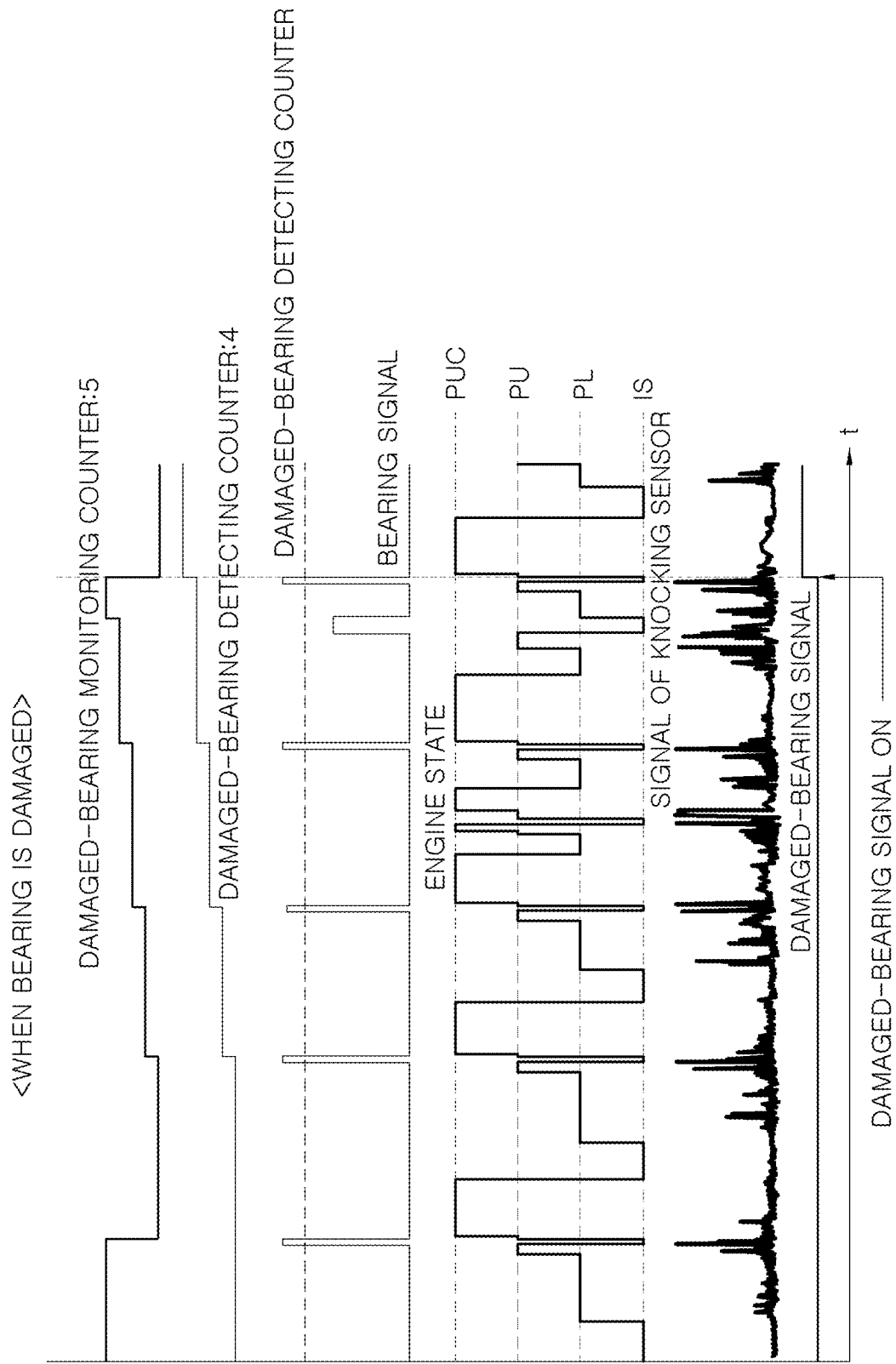
FIG. 8B is a graph illustrating a state of the engine and a state of the knocking sensor when the engine in which the bearing is damaged enters the idle state during deceleration.

FIGS. 8A and 8B illustrate cases in which the bearing 13 is in normal state and in damaged state, during the engine enters the idle state during deceleration. While the engine 10 enters the idle state during deceleration, the load fluctuation occurs so that the RPM of the engine speed is changed to the RPM in the idle state. As compared with the normal bearing, in a state in which the bearing is damaged, a relatively large vibration occurs at the time of the load fluctuation, and therefore, this vibration is detected to judge whether the bearing is damaged.

In a case where the bearing 13 is normal state, when the vehicle is travelled, the engine 10 goes through the deceleration state PUC accompanying fuel cut, the deceleration state PU which does not accompany fuel cut, the partial load state PL and the idle state IS, and is then operated. If the bearing 13 is not damaged (see FIG. 8A), whenever the state in which the engine 10 enters the idle state during deceleration (PU→IS) is detected in the engine state detecting step S140, the monitoring counter is also increased by "1". At the same time, when the engine enters the idle state during deceleration (PU→IS), the bearing signal is increased due to a change in bearing load. However, a magnitude of this bearing signal fails to meet the damaged-bearing criterion, and so the damaged-bearing counter is not increased.

In a state in which the bearing 13 is damaged, however, when a state in which the engine 10 is operated and enters in the idle state during deceleration (PU→IS) is detected (S140), the monitoring counter is also increased by "1" (S150). When the engine 10 enters the idle state during deceleration (PU→IS) in a state in which the bearing 13 is damaged, a clearance is increased due to damage to the bearing 13, so that the vibration generated at a portion on which the bearing is mounted is larger than that generated in a normal state. Accordingly, whenever the signal of the bearing exceeds the damaged-bearing criterion, the damaged-bearing counter is increased (S170), and is accumulated.

During the damaged-bearing judging cumulative monitoring counter for determining damage to the bearing is accumulated to '5', when the cumulative damaged-bearing counter exceeds '2' which is the preset damage determining cumulative damaged-bearing counter, it is determined that the bearing 13 is damaged (S180). The reason why it is determined that the bearing is damaged when the accumulated amount of the damaged-bearing counter becomes '4' rather than '3' in FIG. 8B is that the cumulative monitoring counter becomes '5' when the accumulated amount of the damaged-bearing counter becomes '4'.

As described above, when damage to the bearing is detected during the engine enters the idle state (PU→IS) during deceleration to determine that the bearing 13 is damaged 4 (S180), any one of the limp home mode step S191 and the warning means operating step S192 is performed or both the limp home mode step S191 and the warning means operating step S192 are performed.

Figure 9A:
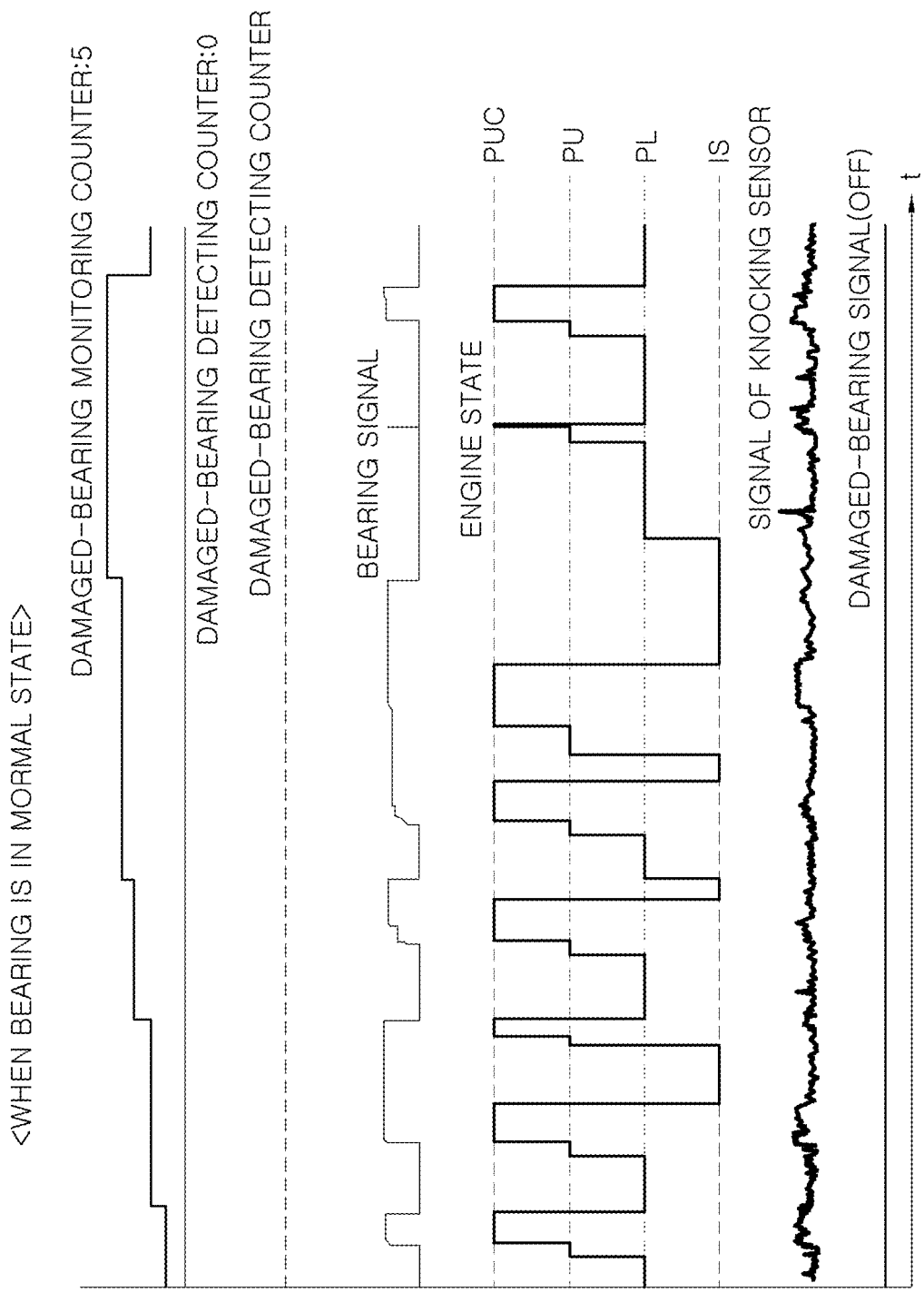
FIG. 9A is a graph illustrating a state of the engine and a state of the knocking sensor when the engine in which the bearing is in a normal state enters the idle state from a fuel cut state during deceleration.
Figure 11A:
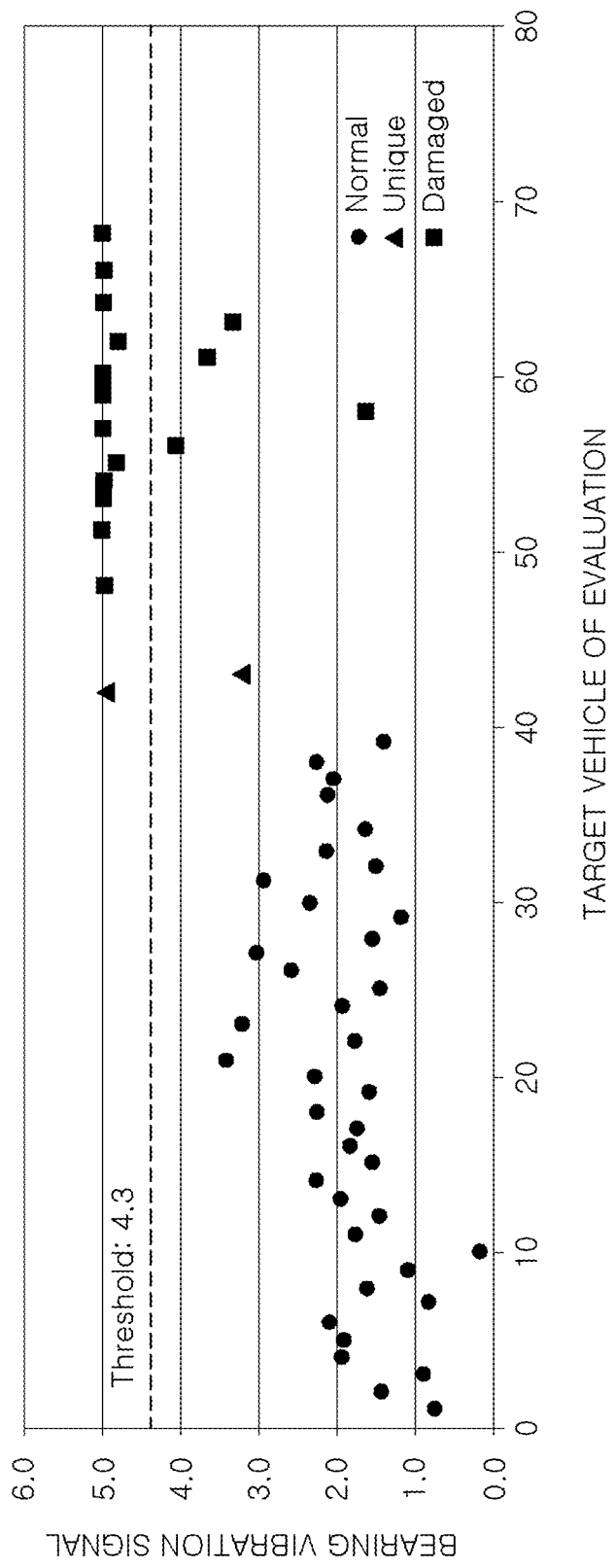
Figure 11E:
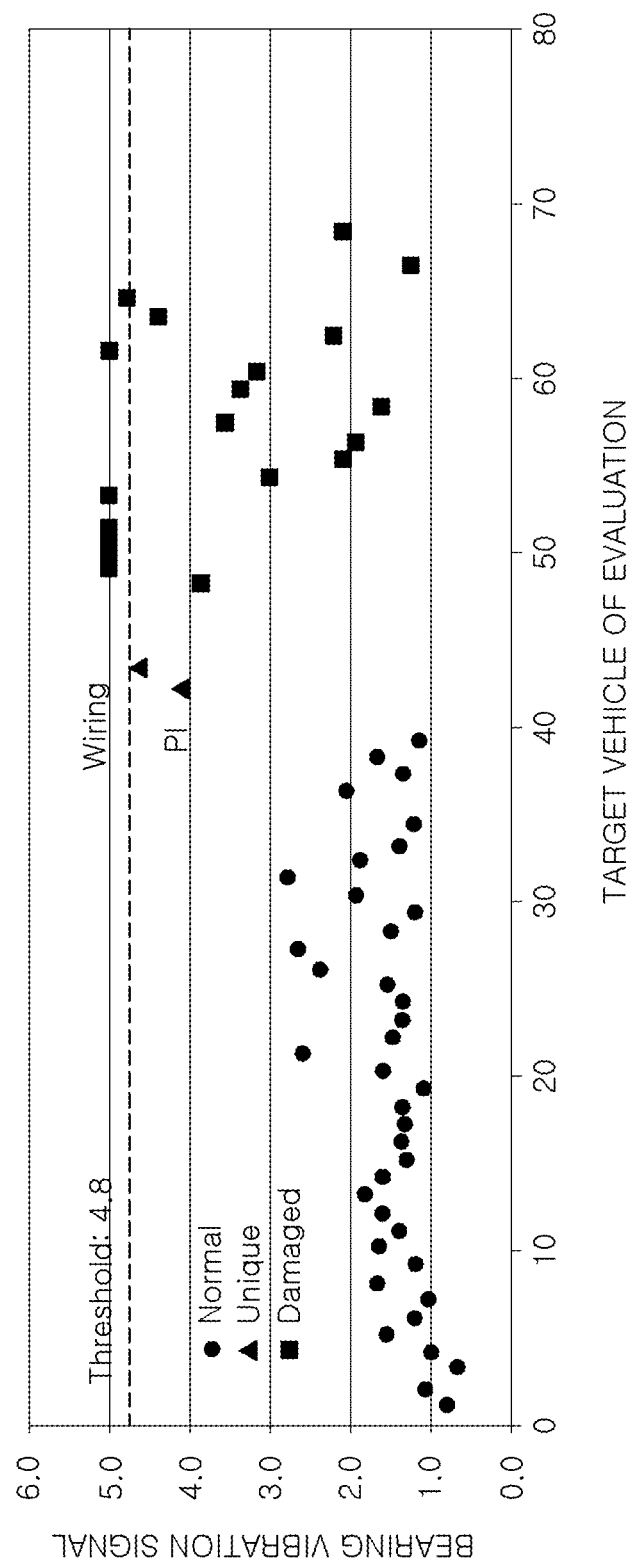

Meanwhile, FIGS. 9A and 9B illustrate cases in which the bearing 13 is in normal state and in damaged state, during the engine enters the idle state from the fuel cut state during deceleration. When the engine 10 enters the idle state from the fuel cut state during deceleration, the engine 10 restarts combustion to change the RPM from the fuel cut state to the idle state during deceleration, and the load fluctuation occurs. As compared with the normal bearing, at this time, if the bearing is damaged, the distinguishable vibration is generated, and damage to the bearing 13 is detected by using this vibration.

In a case where the bearing 13 is normal state, when the vehicle is travelled, the engine 10 goes through the deceleration state PUC accompanying fuel cut, the deceleration state PU which does not accompany fuel cut, the partial load state PL and the idle state IS, and is then operated. If the bearing 13 is not damaged (see FIG. 9A), whenever the state in which the engine 10 enters the idle state from the fuel cut state during deceleration (PUC→IS) is detected in the engine state detecting step S140, the monitoring counter is also increased by 1. Simultaneously, when the engine enters the idle state from the fuel cut state (PUC→IS) during deceleration, the bearing signal is changed due to a change in the bearing load. Although the magnitude of the bearing signal is larger than that in the form described with reference to FIGS. 7A and 8A, the magnitude of the bearing signal fails to meet the damaged-bearing criterion, and so the damaged-bearing counter is not increased and the state of the bearing is consistently monitored.

However, when the engine 10 is operated in a state in which the bearing 13 is damaged and a state in which the engine enters the idle state from the fuel cut during deceleration (PUC→IS) is detected (S140), the monitoring counter is also increased by 1 (S150). In a state in which the bearing 13 is damaged, when the engine 10 enters the idle state from the fuel cut state during decelerating (PUC→IS), a clearance is increased due to damage to the bearing 13, so that the vibration generated from the site to which the bearing 13 is installed is detected to be larger than that in the normal state. At this time, some of the bearing signal exceed the damaged-bearing criterion, and the remaining bearing signal does not exceed the damaged-bearing criterion. Whenever the engine 10 enters the idle state from the fuel cut state during decelerating (PUC→IS) (S140), the monitoring counter is increased (S150), and whenever the bearing signal exceeds the damaged-bearing criterion, the damaged-bearing counter is increased by 1 (S160).

During the accumulated monitoring counter becomes the damaged-bearing judging cumulative monitoring counter ('5'), when the cumulative damaged-bearing counter exceeds the preset criterion ('2'), it is determined that the bearing 13 is damaged (S180).

As described above, when damage to the bearing is detected and damage to the bearing 13 is determined (S180) whenever the engine enters the idle state from the fuel cut state during deceleration, any one of or both the limp home mode step S191 and the warning means operating step (S192) is or are performed.

Meanwhile, FIGS. 10A and 10B illustrate cases in which the bearing is in normal state and in damaged state, when the engine is in the idle state. In a state in which the bearing is damaged, even when the engine is operated in the idle state, the bearing signal, which can be compared with that generated in the normal engine, is generated. Therefore, by detecting this bearing signal, it is judged whether the bearing is damaged.

When it is detected that the engine 10 is operated in the idle state (S140), the monitoring counter increasing step 150 is not performed, and the bearing signal is immediately compared with the damaged-bearing criterion (S160) to increase the damaged-bearing counter (S170), and when the accumulated damaged-bearing counter reaches the damaged-bearing counter determining damage to the bearing, it is determined that the bearing 13 is damaged (S140).

When the engine in which the bearing is not damaged is being operated in the idle state (see FIG. 10A), the RPM of the engine is constant, and the signal generated on the bearing does not exceed the damaged-bearing criterion, so that the damaged-bearing counter is not increased.

However, if the engine in which the bearing is damaged is being operated in the idle state (see FIG. 10B), the bearing signal is compared with the damaged-bearing (S160) and the damaged-bearing counter is increased (S170). If the engine is being operated in the idle state, the bearing signal consistently exceeds the damaged-bearing criterion when the bearing is damaged, so that the damaged-bearing counter is continuously increased. When the damaged-bearing counter which is increased as above reaches the counter determining that the bearing is in a damaged state, it is determined that the bearing 13 is damaged (S180).

Then, any one of the limp home mode step S191 and the warning means operating step S192 is performed or both the limp home mode step S191 and the warning means operating step S192 are performed.

Meanwhile, even when the engine 10 is being operated in a partial load state, if the bearing 13 is damaged, as compared with a normal case, a comparative bearing signal is generated and is detected, damage to the bearing is then detected in a manner which is the same as that employed when the engine is operated in the idle state.

FIGS. 11A to 11E illustrate examples of the damaged-bearing criterion for judging damage to the bearing from the signal generated in the bearing according to the operation state of the engine 10. FIGS. 11A to 11E illustrate examples for setting the damaged-bearing criterion when the engine is in the initial state of deceleration (PU), when the engine enters the idle state during deceleration (PU→IS), when the engine enters the idle state from the fuel cut state during deceleration (PUC→IS), when the engine is operated in the idle state (IS), and when the engine is operated in a partial load state, respectively.

In each of the drawings, a distribution of the vibration signals in the normal case state is relatively concentrated above a damaged-bearing threshold in a normal case, whereas the vibration signals in the state in which the bearing is damaged exceed the damaged-bearing threshold and its distribution is also dispersed.

In addition, the damaged-bearing criterion is also set differently according to operating conditions of the engine 10. This is because the levels of the bearing signals measured by the knocking sensors 15 differ from each other according to the respective engine operating conditions, and accordingly the suitable damaged-bearing criterions may be varied according to the respective engine operating conditions. FIGS. 11A to 11E illustrate an example of the damaged-bearing criterion in each operation state of the engine, the damaged-bearing criterion may be appropriately modified to different values.

According to the above described method of detecting the damage bearing in the engine using the vibration signal, it is possible to process a vibration signal inputted to a knocking sensor which is already mounted on the engine and to detect damage to the bearing, without adding any additional hardware components. Particularly, when the load applied to the bearing is suddenly changed in a state in which the vehicle is being decelerated, damage to the bearing can be correctly detected by means of the distinguishable vibration caused by damage to the bearing.

Since the distinguishable vibration can be detected at the initial stage of damage to the bearing, it is possible to prevent damage to the engine caused by forcibly travelling the vehicle in a state in which the bearing is damaged.

Further, when damage to the bearing is detected, the engine enters the limp home mode of the vehicle, so that it is possible to move the vehicle to a safety zone or a garage while preventing damage to the bearing from being progressed.

In addition, by letting a driver recognize that the bearing is damaged, it is possible to induce the driver to repair the vehicle.

Although the present disclosure has been described with a focus on novel features of the present disclosure applied to various forms, it will be apparent to those skilled in the art that various deletions, substitutions, and changes in the form and details of the apparatus and method described above may be made without departing from the scope of the present disclosure. Accordingly, all modifications within the equivalent scope of the present disclosure are embraced within the scope of the present disclosure.

What is claimed is:

1. A method for detecting a damaged-bearing in an engine, the method comprising:
    separating, by a controller, a vibration signal of the engine detected by a vibration detecting device installed on one side of the engine of a vehicle into a vibration signal generated by combustion knocking and a vibration signal generated by a bearing installed between a crank pin of a crankshaft and a connecting rod;
    extracting a signal in a predetermined natural frequency band from the vibration signal generated by the bearing using a band-pass filter;
    processing, by the controller, the extracted signal to a quantified bearing signal;
    comparing, by the controller, the quantified bearing signal with a preset damaged-bearing criterion;
    determining, by the controller, whether the quantified bearing signal is equal to or greater than the preset damaged-bearing criterion to determine a damage to the bearing, and
    detecting an operating state of the engine using the controller between processing the signal and comparing the bearing signal,
    wherein the preset damaged-bearing criterion is differently set based on the operating state of the engine,
    wherein, in detecting the operating state of the engine, it is judged that the engine is being decelerated and being in a preset condition, and
    it is judged whether a state of the engine is any one of an initial deceleration state in which a decrement of revolution per minute (RPM) of the engine is initiated, a state in which the engine enters an idle state during deceleration while the RPM of the engine is decreased and is changed into the RPM of the idle state, and a state in which the engine enters the idle state from a fuel cut state during deceleration.

2. The method of claim 1, wherein, in processing the extracted signal, a frequency in a range of approximately 1.5 kHz to 2.5 kHz in the vibration signal generated by the bearing is set as a center frequency, a frequency band within a preset frequency band in the center frequency is set as a natural frequency band, and signals other than the natural frequency band are removed.

3. The method of claim 1, further comprising:
    increasing a damaged-bearing counter using the controller when the quantified bearing signal is equal to or greater than the preset damaged-bearing criterion; and
    determining that the bearing is damaged, using the controller when an accumulated damaged-bearing counter is equal to or greater than a preset damage determining cumulative damaged-bearing counter.

4. The method of claim 3, further comprising:
    increasing a monitoring counter when the operating state of the engine is the initial deceleration state, the first operating state or the second operating state,
    wherein, in determining that the bearing is damaged, when the accumulated damaged-bearing counter is equal to or greater than the preset damage determining cumulative damaged-bearing counter within a preset damaged-bearing judging cumulative monitoring counter, the damage to the bearing is determined.

5. The method of claim 4, wherein, in increasing the monitoring counter, the monitoring counter is set for each of the initial deceleration state, the first operating state and the second operating state of the engine, and
    wherein when the engine enters one of the initial deceleration state, the first operating state and the second operating state, the monitor counter is increased based on the entered operating state of the engine.

6. The method of claim 3, further comprising:
    performing a limp home mode for limiting revolutions per minute (RPM) of the engine to a first preset safe RPM or less after determining that the bearing is damaged.

7. The method of claim 6, wherein, in performing the limp home mode, an acceleration pedal value of the vehicle is limited to a preset upper limit value.

8. The method of claim 3, further comprising:
    operating a warning device after determining that the bearing is damaged, the warning device being provided in an interior of the vehicle and configured to alert an occupant that the bearing is damaged.

9. The method of claim 1, further comprising: determining whether the engine is in an idle operating state or in a partial load operating state so as to determine the damage to the bearing.

10. The method of claim 9, wherein when the engine is the idle operating state or in the partial load operating state, only a damaged-bearing counter is accumulated, and the damage to the bearing is determined when the accumulated damaged-bearing counter is equal to or greater than a preset damage determining cumulative damaged-bearing counter.

11. The method of claim 1, further comprising:
    determining whether a diagnosis initiation condition is satisfied to determine whether the vibration signal of the engine sensed by the vibration detecting device is stabilized, before performing separating the vibration signal.

12. The method of claim 11, wherein in determining whether a diagnosis initiation condition is satisfied, whether the engine is warmed-up is determined, and separating the vibration signal of the engine is performed when the engine is warmed up.

13. The method of claim 12, further comprising: determining that the engine is warmed up when a temperature of an engine oil is equal to or higher than a preset temperature.

* * * * *